United States Patent
Oizumi et al.

(10) Patent No.: US 10,231,230 B2
(45) Date of Patent: *Mar. 12, 2019

(54) TRANSMISSION METHOD AND APPARATUS FOR MAPPING DOWNLINK CONTROL INFORMATION AND TRANSMITTING A MAPPED DOWNLINK CONTROL SIGNAL

(71) Applicant: SUN PATENT TRUST, New York, NY (US)

(72) Inventors: Toru Oizumi, Kanagawa (JP); Seigo Nakao, Singapore (SG); Ayako Horiuchi, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,760

(22) Filed: Jan. 30, 2018

(65) Prior Publication Data

US 2018/0152931 A1    May 31, 2018

Related U.S. Application Data

(63) Continuation of application No. 15/478,701, filed on Apr. 4, 2017, now Pat. No. 9,918,309, which is a (Continued)

(30) Foreign Application Priority Data

Jul. 21, 2010  (JP) ................................ 2010-164309

(51) Int. Cl.
  *H04W 72/04*   (2009.01)
  *H04L 5/00*    (2006.01)
  *H04W 84/04*   (2009.01)

(52) U.S. Cl.
  CPC ........... *H04W 72/042* (2013.01); *H04L 5/001* (2013.01); *H04L 5/0053* (2013.01); (Continued)

(58) Field of Classification Search
  CPC ........... H04W 72/042; H04W 72/0446; H04W 84/042; H04L 5/001; H04L 5/0094; (Continued)

(56) References Cited

U.S. PATENT DOCUMENTS

| | | |
|---|---|---|
| 7,873,004 B2 | 1/2011 | Lee et al. |
| 8,385,268 B2 | 2/2013 | Chen et al. |

(Continued)

FOREIGN PATENT DOCUMENTS

| | | |
|---|---|---|
| WO | 2009/057283 A1 | 5/2009 |
| WO | 2009/057286 A1 | 5/2009 |

(Continued)

OTHER PUBLICATIONS

3GPP TSG-RAN WG1 #61bis R1-104118, CMCC, Un R-PDCCH Design, Jun. 28, 2010.

(Continued)

*Primary Examiner* — Tejis Daya

(57) ABSTRACT

In the base station (100), a search, space setting unit (103) sets a search space on the basis of a search space setting rule in accordance with R-PDCCH range of a setting target slot, and an allocating unit (108) places DCI in one of a plurality of candidates of to-be-decoded unit range included in the set search space. The search space setting roles are associated with respective numbers of candidates of to-be-decoded unit range corresponding to the respective ones of a plurality of numbers of connections for R-CCE, and a first search space setting rule of a slot 0 and a second search space setting rule of a slot 1 are different from each other in terms of the patterns related to the numbers of candidates of to-be- (Continued)

decoded unit range corresponding to the plurality of numbers of connections for R-CCE.

12 Claims, 14 Drawing Sheets

Related U.S. Application Data continuation of application No. 15/369,139, filed on Dec. 5, 2016, now Pat. No. 9,655,101, which is a continuation of application No. 14/830,007, filed on Aug. 19, 2015, now Pat. No. 9,549,403, which is a continuation of application No. 14/656,245, filed on Mar. 12, 2015, now Pat. No. 9,155,093, which is a continuation of application No. 13/810,817, filed as application No. PCT/JP2011/003900 on Jul. 7, 2011, now Pat. No. 9,019,922.

(52) U.S. Cl.
CPC ....... *H04L 5/0094* (2013.01); *H04W 72/0446* (2013.01); *H04L 5/006* (2013.01); *H04L 5/0023* (2013.01); *H04L 5/0048* (2013.01); *H04W 84/042* (2013.01)

(58) Field of Classification Search
CPC ..... H04L 5/0053; H04L 5/006; H04L 5/0023; H04L 5/0048
See application file for complete search history.

(56) References Cited

U.S. PATENT DOCUMENTS

| | | | |
|---|---|---|---|
| 8,400,939 | B2 | 3/2013 | Kim et al. |
| 8,401,542 | B2 | 3/2013 | Chung |
| 8,463,262 | B2 | 6/2013 | Kwon et al. |
| 8,711,671 | B2 | 4/2014 | Frederiksen et al. |
| 9,603,136 | B2 | 3/2017 | Hsieh et al. |
| 9,907,064 | B2 * | 2/2018 | Saito .................. H04W 72/042 |
| 2009/0088148 | A1 | 4/2009 | Chung et al. |
| 2009/0209247 | A1 | 8/2009 | Lee et al. |
| 2010/0232388 | A1 | 9/2010 | Nakao et al. |
| 2010/0260124 | A1 | 10/2010 | Noshio et al. |
| 2010/0279628 | A1 | 11/2010 | Love et al. |
| 2010/0302983 | A1 | 12/2010 | McBeath et al. |
| 2011/0038275 | A1 | 2/2011 | Kim et al. |
| 2011/0110316 | A1 | 5/2011 | Chen et al. |
| 2011/0170496 | A1 | 7/2011 | Fong |
| 2011/0205942 | A1 * | 8/2011 | Lindh .................. H04L 5/0053 370/294 |
| 2011/0243090 | A1 | 10/2011 | Grovlen et al. |
| 2011/0269442 | A1 | 11/2011 | Han et al. |
| 2011/0269492 | A1 | 11/2011 | Wang |
| 2012/0093112 | A1 | 4/2012 | Qu |
| 2012/0113932 | A1 | 5/2012 | Nishio et al. |
| 2012/0236813 | A1 | 9/2012 | Tan |
| 2012/0236814 | A1 | 9/2012 | Nishio et al. |
| 2013/0100921 | A1 * | 4/2013 | Nakao .................... H04L 5/001 370/329 |
| 2013/0114563 | A1 | 5/2013 | Oizumi et al. |
| 2014/0064215 | A1 | 3/2014 | Wu |

FOREIGN PATENT DOCUMENTS

| | | |
|---|---|---|
| WO | 2009/116816 A2 | 9/2009 |
| WO | 2011/074265 A1 | 6/2011 |
| WO | 2011/114743 A1 | 9/2011 |

OTHER PUBLICATIONS

3GPP TSG-RAN WG1 Meeting #61bis R1-103815, Nokia, Nokia Siemens Networks, Discussion on R-PDCCH Search Space Design, Jun. 28, 2010.
3GPP TSG-RAN WG1 Meeting #61bis R1-102969, Nokia, Nokia Siemens Networks, Nokia, on DL Backhaul Control Channel Design Aspects, May 10, 2010.
3GPP TS 36.213 V9.2.0, "Physical layer procedures (Release 9)," Jun. 2010.
3GPP TS 36.211 V9.1.0, "Physical Channels and Modulation (Release 9)," May 2010.
3GPP TS 36.212 V9.2.0, "Multiplexing and channel coding (Release 9)," Jun. 2010.
3GPP TSG RAN WG1 meeting, R1-092641, "PDCCH design for Carrier aggregation and Post Rel-8 feature," Jun. 2009.
3GPP TSG RAN WG1 meeting, R1-102700, "Backhaul Control Channel Design in Downlink," May 2010.
3GPP TSG RAN WG1 meeting, R1-102881, "R-PDCCH placement," May 2010.
3GPP TSG RAN WG1 meeting, R1-103040, "R-PDCCH search space design," May 2010.
3GPP TSG RAN WG1 meeting, R1-103062, "Supporting frequency diversity and frequency selective R-PDCCH transmissions," May 2010.
International Search Report for Application No. PCT/JP2011/003900 dated Aug. 2, 2011.

* cited by examiner

| PDCCH format | Number of CCEs | Number of candidates in C-SS | Number of candidates in UE-SS |
|---|---|---|---|
| 0 | 1 | — | 6 |
| 1 | 2 | — | 6 |
| 2 | 4 | 4 | 2 |
| 3 | 8 | 2 | 2 |

*FIG. 3*
PRIOR ART

|  | slot0 | slot1 |
|---|---|---|
| Cell-specific RS, normal subframe (1,2,4 antenna port(s))※1 | 46, 44, 44 | 80, 76, 72 |
| Cell-specific RS, extended subframe (1,2,4 antenna port(s))※1 | 34, 32, 32 | 68, 64, 60 |
| MBSFN RS subframe (extended cyclic prefix $\Delta f$=15kHz)※1 | 36 | 60 |
| UE-specific RS, normal subframe (antenna port 5)※1 | 42 | 78 |
| UE-specific RS, extended subframe (antenna port 5)※1 | 32 | 64 |
| UE-specific RS, special subframe with configuration 1,2,6 or 7 (antenna port 7 and 8)※1 | 39 | 84 |
| UE-specific RS, special subframe with configuration 3, 4 or 8 (antenna port 7 and 8)※1 | 45 | 78 |
| UE-specific RS, downlink subframe (antenna port 7 and 8)※1 | 42 | 78 |
| CRS, normal subframe (rank 1, 2, 3 and 4)※2 | 44 | 72 |
| DM-RS, normal subframe (rank 1 and 2)※2 | 36 | 66 |
| DM-RS, normal subframe (rank 3 and 4)※2 | 30 | 60 |

*FIG. 13*

| ADEQUATE NUMBER OF REs | R-CCE AGGREGATION LEVEL | |
|---|---|---|
| | Slot 0 | Slot 1 |
| LARGE ↑ ↓ SMALL | | 8 |
| | 8 | 4 |
| | 4 | 2 |
| | 2 | 1 |
| | 1 | |

*FIG. 14*

| | Slot0 | | | | Slot1 | | | |
|---|---|---|---|---|---|---|---|---|
| R-CCE AGGREGATION LEVEL | 1 | 2 | 4 | 8 | 1 | 2 | 4 | 8 |
| NUMBER OF BLIND DECODING OPERATIONS PER DCI BIT COUNT TYPE | 6 | 6 | 2 | 2 | ~~6~~ 6 | ~~2~~ 2 | ~~2~~ 2 | ~~2~~ (2) |

*FIG. 15*

| R-CCE AGGREGATION LEVEL | Slot0 | | | | Slot1 | | | |
|---|---|---|---|---|---|---|---|---|
| | 1 | 2 | 4 | 8 | 1 | 2 | 4 | 8 |
| NUMBER OF BLIND DECODING OPERATIONS PER DCI BIT COUNT TYPE | 6 | 6 | 2 | 2 | ~~6~~ 6 (+2) | ~~2~~ 2 (+1) | ~~2~~ 2 (+1) | ~~2~~ 2 (+0) |

FIG. 16       ALLOCATION PATTERN

| R-CCE AGGREGATION LEVEL | Slot0 | | | | Slot1 | | | |
|---|---|---|---|---|---|---|---|---|
| | 1 | 2 | 4 | 8 | 1 | 2 | 4 | 8 |
| NUMBER OF BLIND DECODING OPERATIONS PER DCI BIT COUNT TYPE | ~~X~~ (2) | ~~X~~ 6 | ~~X~~ 6 | ~~X~~ 2 | 6 | 6 | 2 | 2 |

FIG. 17

| R-CCE AGGREGATION LEVEL | Slot0 | | | | Slot1 | | | |
|---|---|---|---|---|---|---|---|---|
| | 1 | 2 | 4 | 8 | 1 | 2 | 4 | 8 |
| NUMBER OF BLIND DECODING OPERATIONS PER DCI BIT COUNT TYPE | ~~X~~ 0 (+0) | ~~X~~ 6 (+1) | ~~X~~ 6 (+1) | ~~X~~ 2 (+0) | 6 | 6 | 2 | 2 |

ALLOCATION PATTERN

FIG. 18

TRANSMISSION METHOD AND APPARATUS FOR MAPPING DOWNLINK CONTROL INFORMATION AND TRANSMITTING A MAPPED DOWNLINK CONTROL SIGNAL

CROSS REFERENCE TO RELATED APPLICATIONS

This continuation application claims priority to U.S. patent application Ser. No. 15/478,701, filed Apr. 4, 2017, entitled "RECEPTION APPARATUS AND METHOD FOR EFFICIENTLY UTILIZING DOWNLINK ALLOCATION CONTROL INFORMATION" which claims priority to U.S. patent application Ser. No. 15/369,139, filed Dec. 5, 2016, entitled "TRANSMISSION APPARATUS AND METHOD FOR EFFICIENTLY TRANSMITTING DOWNLINK ALLOCATION CONTROL INFORMATION" which claims priority to U.S. patent application Ser. No. 14/830,007, filed Aug. 19, 2015, entitled "BASE STATION, TERMINAL, TRANSMISSION METHOD AND RECEPTION METHOD" which claims priority to U.S. patent application Ser. No. 14/656,245, filed Mar. 12, 2015, entitled "BASE STATION, TERMINAL, TRANSMISSION METHOD AND RECEPTION METHOD" which claims priority to U.S. patent application Ser. No. 13/810,817, filed Jan. 17, 2013, entitled "BASE STATION, TERMINAL, TRANSMISSION METHOD AND RECEPTION METHOD" and PCT/JP2011/003900, filed Jul. 7, 2011, the entireties of which are incorporated herein by reference.

TECHNICAL FIELD

The claimed invention relates to a base station, a terminal, a transmission method and a reception method.

BACKGROUND ART

In 3rd Generation Partnership Project Radio Access Network Long Term Evolution (3GPP-LTE (hereinafter referred to as LTE)), Orthogonal Frequency Division Multiple Access (OFDMA) is adopted as a downlink communication scheme, and Single Carrier Frequency Division Multiple Access (SC-FDMA) is adopted as an uplink communication scheme (e.g., see NPL-1, NPL-2, and NPL-3).

In LTE, a base station apparatus for radio communications (hereinafter abbreviated as "base station") performs communications by allocating a resource block (RB) in a system band to a terminal apparatus for radio communications (hereinafter abbreviated as "terminal") for every time unit called "subframe." The base station also transmits allocation control information (i.e., L1/L2 control information) for the notification of the result of resource allocation of downlink data and uplink data to the terminal. The allocation control information is transmitted to the terminal through a downlink control channel such as a Physical Downlink Control Channel (PDCCH). A resource region to which a PDCCH is to be mapped is specified. As shown in FIG. 1, a PDCCH covers the entire system bandwidth in the frequency-domain and the region occupied by the PDCCH in the time-domain varies between a leading first OFDM symbol and a third OFDM symbol in a single subframe. A signal indicating a range of OFDM symbols occupied by a PDCCH in the time-domain direction is transmitted through a Physical Control Format Indicator Channel (PCFICH).

Each PDCCH also occupies a resource composed of one or more consecutive control channel elements (CCEs). In a PDCCH, one CCE consists of 36 resource elements (RE). In LTE, the number of CCEs occupied by a PDCCH (CCE aggregation level, or simply aggregation level) is selected from 1, 2, 4, and 8 depending on the number of bits of allocation control information or the condition of a propagation path of a terminal. In LTE a frequency band having a system bandwidth of up to 20 MHz is supported.

Allocation control information transmitted from a base station is referred to as downlink control information (DCI). If a base station allocates a plurality of terminals to one subframe, the base station transmits a plurality of items of DCI simultaneously. In this case, in order to identify a terminal to which each item of DCI is transmitted, the base station transmits the DCI with CRC bits included therein, the bits being masked (or scrambled) with a terminal ID of the transmission destination terminal. Then, the terminal performs demasking (or descrambling) on the CRC bits of a plurality of items of possible DCI directed to the terminal with its own ID, thereby blind-decoding a PDCCH to detect the DCI directed to the terminal.

DCI also includes resource information allocated to a terminal by a base station (resource allocation information) and a modulation and channel coding scheme (MCS). Furthermore, DCI has a plurality of formats for uplink, downlink Multiple Input Multiple Output (MIMO) transmission, and downlink non-consecutive band allocation. A terminal needs to receive both downlink allocation control information (i.e., allocation control information about a downlink) and uplink allocation control information (i.e., allocation control information about an uplink) which have a plurality of formats.

For example, for the downlink allocation control information, formats of a plurality of sizes are defined depending on a method for controlling a transmission antenna of a base station and a method for allocating a resource. Among the formats, a downlink allocation control information format for consecutive band allocation (hereinafter simply referred to as "downlink allocation control information") and an uplink allocation control information format for consecutive band allocation (hereinafter simply referred to as "uplink allocation control information") have the same size. These formats (i.e., DCI formats) include type information (for example, a one-bit flag) indicating the type of allocation control information (downlink allocation control information or uplink allocation control information). Thus, even if DCI indicating downlink allocation control information and DCI indicating uplink allocation control information have the same size, a terminal can determine whether specific DCI indicates downlink allocation control information or uplink allocation control information by checking type information included in allocation control information.

The DCI format in which uplink allocation control information for consecutive band allocation is transmitted is referred to as "DCI format 0" (hereinafter referred to as "DCI 0"), and the DCI format in which downlink allocation control information for consecutive band allocation is transmitted is referred to as "DCI format 1A" (hereinafter referred to as "DCI 1A"). Since DCI 0 and DCI 1A are of the same size and distinguishable from each other by referring to type information as described above, hereinafter, DCI 0 and DCI 1A will be collectively referred to as DCI 0/1 A.

In addition to these DCI formats, there are other formats for downlink, such as DCI format 1 used for non-consecutive band allocation (hereinafter referred to as DCI 1) and DCI formats 2 and 2A used for allocating spatial multiplexing MIMO transmission (hereinafter referred to as DCI 2 and 2A). DCI 1, DCI 2, and DCI 2A are formats that are dependent on a downlink transmission mode of a terminal (non-consecutive band allocation or spatial multiplexing MIMO transmission) and configured for each terminal. In contrast, DCI 0/1A is a format that is independent of the transmission mode and can be used for a terminal having any transmission mode, i.e., a format commonly used for every terminal. If DCI 0/1A is used, single-antenna transmission or a transmit diversity scheme is used as a default transmission mode.

Also, for the purpose of reducing the number of blind decoding operations to reduce a circuit scale of a terminal, a method for limiting CCEs targeted for blind decoding for each terminal has been under study. This method limits a CCE region that may be targeted for blind decoding by each terminal (hereinafter referred to as "search space"). As used herein, a CCE region unit allocated to each terminal (i.e., corresponding to a unit for blind decoding) is referred to as "downlink control information allocation region candidate (i.e., DCI allocation region candidate)" or "unit region candidate targeted for decoding."

In LTE, a search space is configured for each terminal at random. The number of CCEs that form a search space is defined per CCE aggregation level of a PDCCH. For example, as shown in FIG. 2, the numbers of CCEs forming search spaces are 6, 12, 8, and 16 for PDCCH CCE aggregation levels 1, 2, 4, and 8, respectively. In this case, the numbers of unit region candidates targeted for decoding are 6 (=6/1), 6 (=12/2), 2 (=8/4), and 2 (=16/8) for PDCCH CCE aggregation levels 1, 2, 4, and 8, respectively (see FIG. 3). In other words, the total number of unit region candidates targeted for decoding is limited to 16. Thus, since each terminal may perform blind-decoding only on a group of unit region candidates targeted for decoding in a search space allocated to the terminal, the number of blind decoding operations can be reduced. A search space in each terminal is configured using a terminal ID of each terminal and a hash function for randomization. A terminal-specific CCE region is referred to as "UE specific search space (UE-SS)".

The PDCCH also includes control information for data allocation, the information being common to a plurality of terminals and notified to the plurality of terminals simultaneously (for example, allocation information about downlink broadcast signals and allocation information about signals for paging) (hereinafter referred to as "control information for a shared channel"). To transmit the control information for a shared channel, a CCE region common to all the terminals that are to receive downlink broadcast signals (hereinafter referred to as "common search space: C-SS") is used for the PDCCH. A C-SS includes just six unit region candidates targeted for decoding in total, namely, 4 (=16/4) and 2 (=16/8) candidates for CCE aggregation levels 4 and 8, respectively (see FIG. 3).

In a UE-SS, the terminal performs blind-decoding for the DCI formats of two sizes, i.e., the DCI format (DCI 0/1A) common to all the terminals and the DCI format (one of DCI 1, DCI 2 and DCI 2A) dependent on the transmission mode. For example, in a UE-SS, the terminal performs 16 blind-decoding operations for each of the DCI formats of the two sizes as described above. A transmission mode notified by the base station determines for which two sizes of the DCI formats the blind decoding is performed. In contrast, in a C-SS, the terminal performs six blind-decoding operations on each of DCI format 1C, which is a format for shared channel allocation (hereinafter referred to as "DCI 1C") and DCI 1A, (i.e., 12 blind decoding operations in total) regardless of a notified transmission mode.

DCI 1A used for shared channel allocation and DCI 0/1A used for terminal-specific data allocation have the same size, and terminal IDs are used to distinguish between DCI 1A and DCI 0/1A. Thus, the base station can transmit DCI 0/1A used for terminal-specific data allocation in a C-SS as well without an increase in the number of blind decoding operations to be performed by the terminals.

Also, the standardization of 3GPP LTE-Advanced (hereinafter referred to as LTE-A), which provides a data transfer rate higher than that of LTE, has been started. In LTE-A, in order to achieve a downlink transfer rate of up to 1 Gbps and an uplink transfer rate of up to 500 Mbps, base stations and terminals (hereinafter referred to as LTE-A terminals) capable of communicating at a wideband frequency of 40 MHz or higher will be introduced. An LTE-A system is also required to support terminals designed for an LTE system (hereinafter referred to as LTE terminals) in the system in addition to LTE-A terminals.

In LTE-A, a new uplink transmission method will be introduced that uses a non-consecutive band allocation and MIMO. Accordingly, the definitions of new DCI formats (e.g., DCI formats 0A and 0B (hereinafter referred to as DCI 1A and DCI 0B)) (e.g., see NPL-4) are being studied. In other words, DCI 0A and DCI 0B are DCI formats that depend on the uplink transmission mode.

As described, in LTE-A, if a DCI format (any one of DCI 1, DCI 2, and DCI 2A) dependent on the downlink transmission mode, a DCI format dependent on the uplink transmission mode (any one of DCI 0A and DCI 0B), and a DCI format independent of the transmission mode and common to all the terminals (DCI 0/1A) are used in UE-SS, then the terminal performs blind-decoding (monitoring) on DCI of the abovementioned three DCI formats. For example, as described above, since a UE-SS needs 16 blind decoding operations per DCI format, the total number of blind decoding operations in the UE-SS is 48 (=16×3). Accordingly, 60 blind decoding operations in total is needed after adding 12 (=6×2), i.e., the number of blind decoding operations for the two DCI formats in the C-SS.

Additionally, in LTE-A, to achieve an increased coverage, the introduction of radio communication relay apparatus (hereinafter referred to as "relay station" or "Relay Node" (RN)) has been specified (see FIG. 4). Accordingly, the standardization of downlink control channels from base stations to relay stations (hereinafter referred to as "R-PDCCH") is under way (e.g., see NPL-5, NPL-6, NFL-7, and NPL-8). At present, the following matters are being studied in relation to the R-PDCCH. FIG. 5 illustrates an example of an R-PDCCH region.

(1) A mapping start position in the time-domain of an R-PDCCH is fixed at the fourth OFDM symbol from the beginning of a subframe, and thus does not depend on the rate at which a PDCCH occupies OFDM symbols in the time-domain.

(2) As a mapping method in the frequency-domain of an R-PDCCH, two disposing methods, "localized" and "distributed" are supported.

(3) As reference signals for demodulation, Common Reference Signal (CRS) and Demodulation Reference Signal (DM-RS) are supported. The base station notifies the relay station as to which reference signal is used.

(4) Each R-PDCCH occupies a resource composed of one or more consecutive Relay-Control Channel Elements (R-CCEs). The number of REs forming one R-CCE varies for each slot, or for each reference signal location. Specifically, in slot 0, a R-CCE is defined as a resource region having, in the time direction, a range of from the third OFDM symbol to the end of slot 0, and having, in the frequency direction, a range of 1 RB's width (excluding, however, the region onto which the reference signal is mapped). In addition, in slot 1, a R-CCE is defined as a resource region having, in the time direction, a range of from the beginning of slot 1 to the end of slot 1, and having, in the frequency direction, a range of 1 RB's width (excluding, however, the region onto which the reference signal is mapped). However, proposals have also been made to divide the above-mentioned resource region into two in slot 1, and to have each be one R-CCE.

CITATION LIST

Non-Patent Literature

NPL 1: 3GPP TS 36.211 V9.1.0, "Physical Channels and Modulation (Release 9)," May 2010
NPL 2: 3GPP TS 36.212 V9.2.0, "Multiplexing and channel coding (Release 9)," June 2010
NPL 3: 3GPP TS 36.213 V9.2.0, "Physical layer procedures (Release 9)," June 2010
NPL 4: 3GPP TSG RAN WG1 meeting, R1-092641, "PDCCH design for Carrier aggregation and Post Rel-8 feature," June 2009
NPL 5: 3GPP TSG RAN WG1 meeting, R1-102700, "Backhaul Control Channel Design in Downlink." May 2010
NPL 6: 3GPP TSG RAN WG1 meeting, R1-102881, "R-PDCCH placement," May 2010
NPL 7: 3GPP TSG RAN WG1 meeting, R1-103040, "R-PDCCH search space design," May 2010
NPL 8: 3GPP TSG RAN WG1 meeting, R1-103062, "Supporting frequency diversity and frequency selective R-PDCCH transmissions," May 2010

SUMMARY OF INVENTION

Technical Problem

It is anticipated that resources for a resource region to which a PDCCH for a terminal under the control of a base station is mapped (hereinafter referred to as "PDCCH region") may become insufficient in some cases. One potential method for addressing this resource shortage is to dispose the DCI for the terminal under the control of the base station in the resource region to which the R-PDCCH is mapped (hereinafter referred to as "R-PDCCH region") (see FIG. 6).

However, simply adding an R-PDCCH region to a PDCCH region as a resource region for transmitting DCI to a terminal connected to a base station may disadvantageously lead to an increase in the number of blind decoding operations to be performed by the terminal, resulting in increases in power consumption, processing delay, and circuit scale. For example, according to the above-described configuration of a search space, in one subframe, a search space is configured, for each of a PDCCH region, an R-PDCCH region of slot 0, and an R-PDCCH region of slot 1. Thus, if the number of blind decoding operations to be performed by a terminal in each region is 60 as mentioned above, the terminal would repeat 180 blind decoding operations (=60×3 regions) in total for each subframe. In other words, the number of blind decoding operations increases and the configuration of a terminal becomes complicated.

Also, another possible configuration method might be one where a search space is allocated to each of a PDCCH region and R-PDCCH regions (slot 0 and slot 1) in such a manner that the total number of region candidates for blind decoding (i.e., the total number of blind decoding operations) by a terminal in one subframe is made to be generally comparable to the above-mentioned related art (e.g., 60 operations). In this case, however, the size of the search space in each of the PDCCH region, the R-PDCCH region in slot 0, and the R-PDCCH region in slot 1 becomes approximately ⅓, and thus the possibility that the base station becomes unable to allocate CCEs to DCI for a specific terminal (i.e., a blocking probability) may increase. In other words, it may lead to a drop in system throughput as a result of not being able to use resources efficiently. Accordingly, a method is desired where downlink allocation control information intended for a terminal under the control of the base station is efficiently transmitted using a resource region provided for downlink allocation control information intended for a relay station.

The claimed invention is made in view of the points above, and an object thereof is to provide a base station, a terminal, a transmission method, and a reception method that are capable of efficiently transmitting downlink allocation control information.

Solution to Problem

A base station according to one aspect of the claimed invention comprises: a configuration section that configures a search space based on a search space configuration rule corresponding to a slot to be configured, the search space being defined by a plurality of unit region candidates targeted for decoding at a terminal, each of the unit region candidates targeted for decoding being formed by one control channel element or a plurality of concatenated control channel elements; and a transmitting section that disposes DCI in any of the plurality of unit region candidates targeted for decoding included in the configured search space and transmits the DCI to the terminal, wherein in the search space configuration rule, a plurality of aggregation levels for the control channel elements are associated with respective numbers of unit region candidates targeted for decoding, and a first search space configuration rule used for a first slot and a second search space configuration rule used for a second slot have mutually different patterns regarding the numbers of unit region candidates targeted for decoding corresponding to the plurality of aggregation levels for the control channel elements.

A terminal according to one aspect of the claimed invention comprises: a first receiving section that configures a search space based on a search space configuration rule and performs blind decoding on each of a plurality of unit region candidates targeted for decoding forming the search space, each of the unit region candidates targeted for decoding being formed by one control channel element or a plurality of concatenated control channel elements; and a second receiving section that receives a downlink data signal based on DCI intended for the terminal and disposed in any of the plurality of unit region candidates targeted for decoding, wherein in the search space configuration rule, a plurality of aggregation levels for the control channel elements are respectively associated with numbers of unit region candidates targeted for decoding, and a first search space configuration rule used for a first slot and a second search space configuration rule used for a second slot have mutually different patterns regarding the numbers of unit region candidates targeted for decoding corresponding to the plurality of aggregation levels for the control channel elements.

A transmission method according to one aspect of the claimed invention- comprises the steps of: configuring a search space based on a search space configuration rule corresponding to a slot to be configured, the search space being defined by a plurality of unit region candidates targeted for decoding at a terminal, each of the unit region candidates targeted for decoding being formed by one control channel element or a plurality of concatenated control channel elements; and disposing DCI in any of the plurality of unit region candidates targeted for decoding included in the configured search space and transmitting the DCI to the terminal, wherein in the search space configuration rule, a plurality of aggregation levels for the control channel elements are associated with respective numbers of unit region candidates targeted for decoding; and a first search space configuration rule used for a first slot and a second search space configuration rule used for a second slot have mutually different patterns regarding the numbers of unit region candidates targeted for decoding corresponding to the plurality of aggregation levels for the control channel elements.

A reception method according to one aspect of the claimed invention comprises the steps of: configuring a search space based on a search space configuration rule and performing blind decoding on each of a plurality of unit region candidates targeted for decoding forming the search space, each of the unit region candidates targeted for decoding being formed by one control channel element or a plurality of concatenated control channel elements; and receiving a downlink data signal based on DCI intended for oneself and disposed in any of the plurality of unit region candidates targeted for decoding, wherein in the search space configuration rule, a plurality of aggregation levels for the control channel elements are respectively associated with numbers of unit region candidates targeted for decoding; and a first search space configuration rule used for a first slot and a second search space configuration rule used for a second slot have mutually different patterns regarding the numbers of unit region candidates targeted for decoding corresponding to the plurality of aggregation levels for the control channel elements.

Advantageous Effects of Invention

With the claimed invention, it is possible to provide a base station, a terminal, a transmission method, and a reception method capable of efficiently transmitting downlink allocation control information.

BRIEF DESCRIPTION OF DRAWINGS

FIG. 3 is a diagram for explaining search spaces;
FIG. 13 is a diagram showing examples of the number of REs forming one R-CCE;
FIG. 14 is a diagram comparing slot 0 and slot 1 in terms of the relationship between the adequate number of REs and R-CCE aggregation level;
FIG. 15 is a diagram illustrating variation 2 of a search space configuration rule;
FIG. 16 is a diagram illustrating variation 3 of a search space configuration rule;
FIG. 17 is a diagram illustrating variation 4 of a search space configuration rule;
FIG. 18 is a diagram illustrating variation 5 of a search space configuration rule.

DESCRIPTION OF EMBODIMENTS

Figure 1:
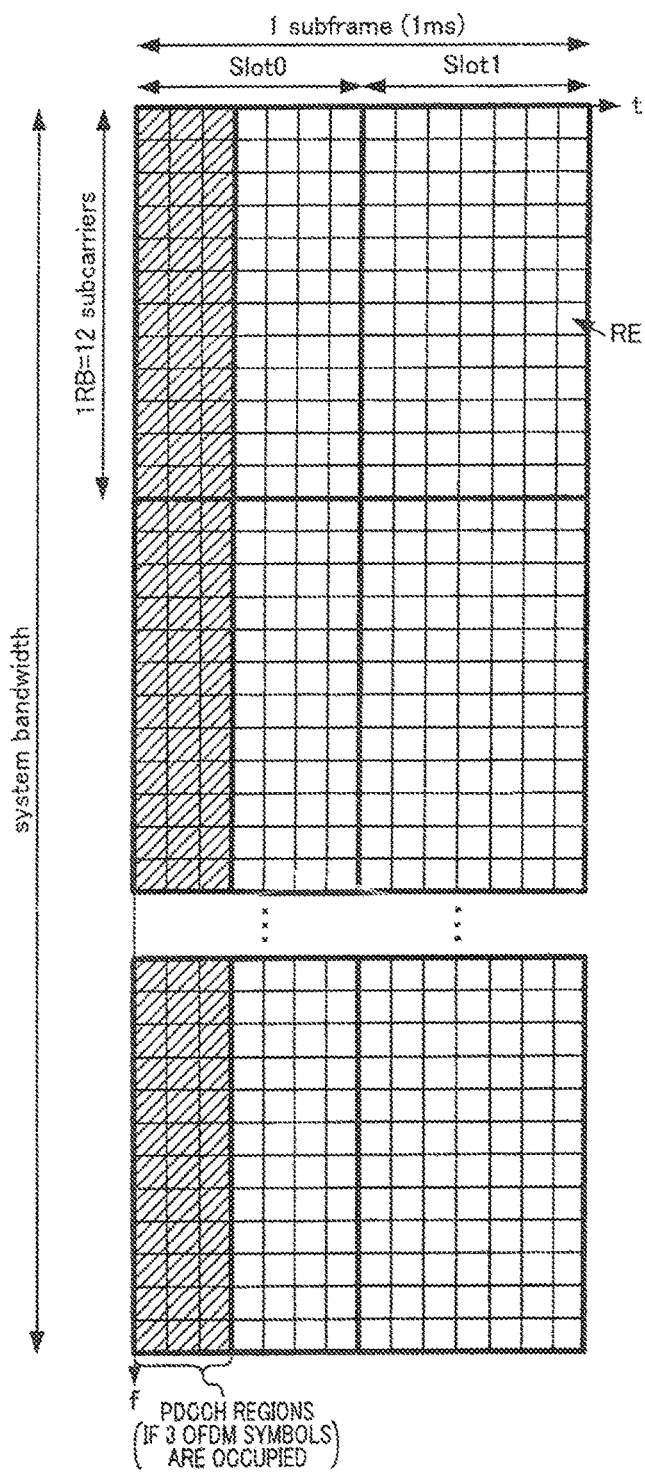
FIG. 1 illustrates an example PDCCH region.

Embodiments of the claimed invention are described in detail below with reference to the accompanying drawings. In the embodiments, the same reference numerals are used for denoting the same components, and a redundant description thereof is omitted.

(Embodiment 1)
(System Overview)

A communication system according to Embodiment 1 of the claimed invention includes base station 100 and terminal 200. Base station 100 is an LTE-A base station, and terminal 200 is an LTE-A terminal.

Figure 7:
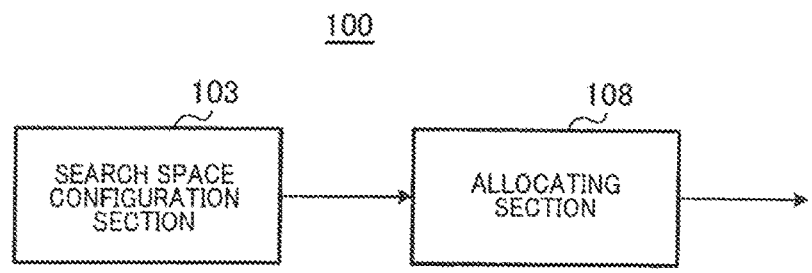
FIG. 7 is a principal block diagram of a base station according to Embodiment 1 of the claimed invention.

FIG. 7 is a principal block diagram of base station 100 according to Embodiment 1 of the claimed invention. Search space configuration section 103 of base station 100 configures, based on a search space configuration rule and per slot for each downlink control channel, a search space defined by a plurality of unit region candidates targeted for decoding in terminal 200. Allocating section 108 disposes DCI in any of the unit region candidates targeted for decoding. Thus, the DCI disposed in the unit region candidate targeted for decoding is transmitted to terminal 200.

Figure 8:
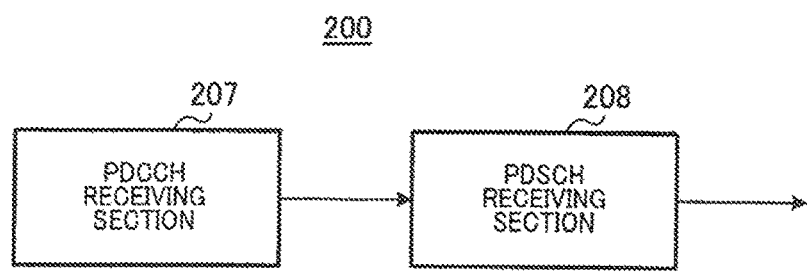
FIG. 8 is a principal block diagram of a terminal according to Embodiment 1 of the claimed invention.

FIG. 8 is a principal block diagram of terminal 200 according to Embodiment 1 of the claimed invention. In terminal 200, PDCCH receiving section 207 configures a search space based on a search space configuration rule, and performs blind decoding on each of a plurality of unit region candidates targeted for decoding forming the search space. PDSCH receiving section 208 receives downlink data signals on the basis of the DCI disposed in any one of the unit region candidates targeted for decoding and directed to the device.

(Configuration of Base Station 100)

Figure 9:
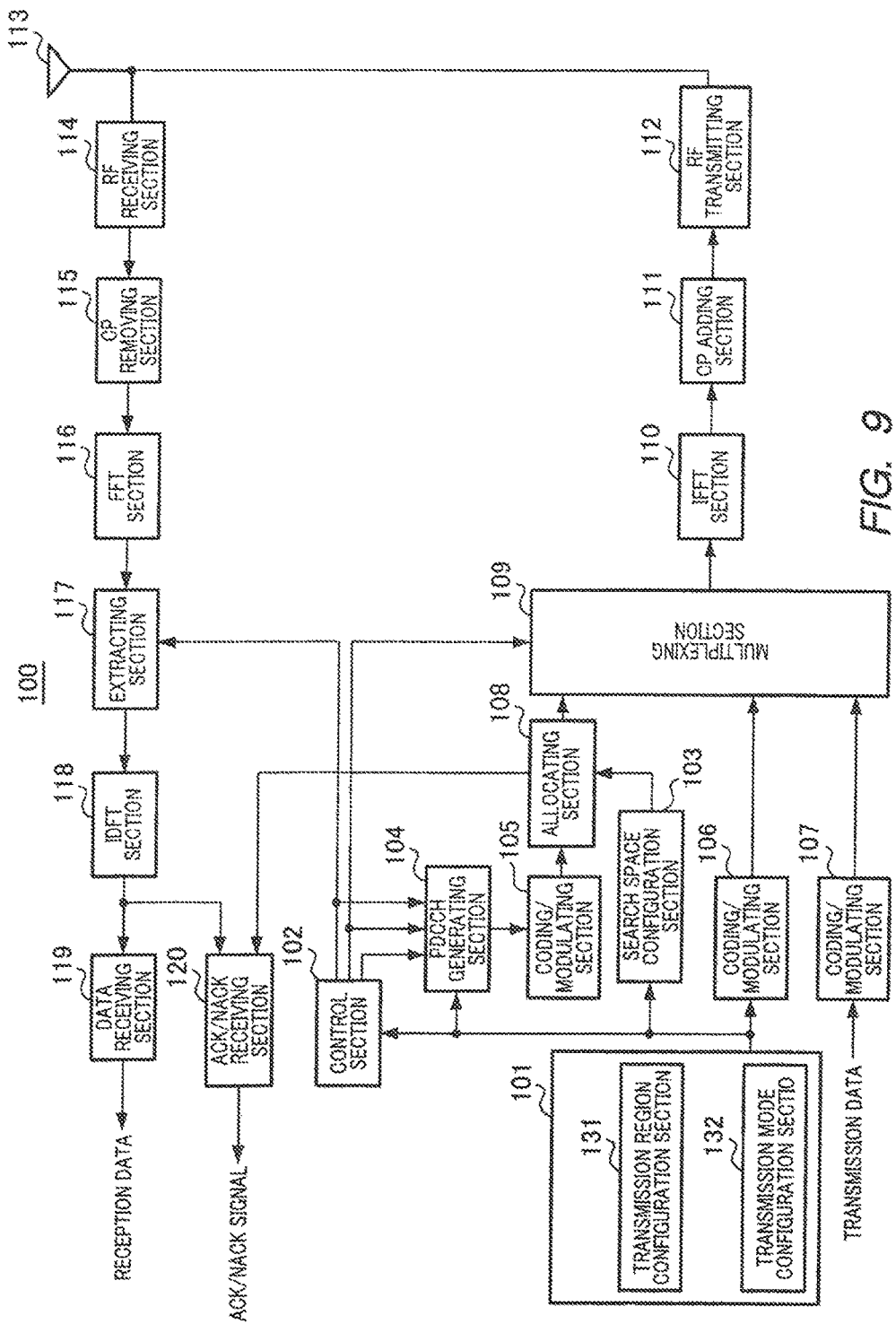
FIG. 9 is a block diagram illustrating the configuration of the base station according to Embodiment 1 of the claimed invention.

FIG. 9 is a block diagram illustrating a configuration of base station 100 according to Embodiment 1 of the claimed invention. In FIG. 9, base station 100 includes configuration section 101, control section 102, search space configuration section 103, PDCCH generating section 104, coding/modulating sections 105, 106 and 107, allocating section 108, multiplexing section 109, inverse fast Fourier transform (IFFT) section 110, cyclic prefix (CP) adding section 111, RF transmitting section 112, antenna 113, RF receiving section 114, CP removing section 115, fast Fourier transform (FFT) section 116, extracting section 117, inverse discrete Fourier transform (IDFT), section 118, data receiving section 119, and ACK/NACK receiving section 120.

Configuration section 101 configures a resource region for use in the transmission of DCI to terminal 200 and also configures each transmission mode for uplink and downlink for terminal 200. The configuring of a resource region and the configuring of a transmission mode are performed for each terminal 200 to be configured. Configuration information about a resource region and a transmission mode is sent to control section 102, search space configuration section 103, PDCCH generating section 104, and coding/modulating section 106.

Specifically, configuration section 101 includes transmission region configuration section 131 and transmission mode configuration section 132.

Transmission region configuration section 131 configures a resource region for use in the transmission of DCI to terminal 200. Candidates for the resource regions to be configured include a PDCCH region, an R-PDCCH region in slot 0, and an R-PDCCH region in slot 1. For example, normally, a PDCCH region is configured for terminal 200, and a large number of terminals 200 communicate under the control of base station 100. Accordingly, if the allocation of PDCCH region is expected to be tight or if it is determined that significant interference occurs in the PDCCH region, then an R-PDCCH region in slot 0 or an R-PDCCH region in slot 1 is configured for terminal 200.

Transmission mode configuration section 132 configures the transmission mode (for example, spatial multiplexing MIMO transmission, beamforming transmission, and non-consecutive band allocation) of each of uplink and downlink for terminal 200.

Configuration information about a resource region and a transmission mode is reported to each terminal 200 via coding/modulating section 106 as upper-layer control information (RRC control information or RRC signaling).

Control section 102 generates allocation control information including MCS information, resource (i.e., RB) allocation information, and a new data indicator (NDI). As the resource allocation information, control section 102 generates uplink resource allocation information indicating an uplink resource (for example, a Physical Uplink Shared Channel (PUSCH)) to which uplink data from terminal 200 is allocated, or downlink resource allocation information indicating a downlink resource (for example, a Physical Downlink Shared Channel (PDSCH)) to which downlink data to terminal 200 is allocated.

Furthermore, on the basis of configuration information received from configuration section 101, control section 102 generates, for each terminal 200, allocation control information (any one of DCI 0A and DCI 0B) based on a transmission mode of the uplink for terminal 200, allocation control information (any one of DCI 1, DCI 1B, DCI 1D, DCI 2, and DCI 2A) based on a transmission mode of the downlink, or allocation control information (DCI 0/1A) common to all the terminals.

For example, in order to improve throughput during normal data transmission, control section 102 generates allocation control information (any one of DCI 1, DCI 1B, DCI 1D, DCI 2, DCI 2A, DCI 0A, and DCI 0B) corresponding to the transmission mode of each terminal 200 so as to allow data transmission in the transmission mode configured for each terminal 200. As a result, data can be transmitted in the transmission mode configured for each terminal 200, which improves throughput.

However, an abrupt change in the condition of a propagation path or a change in interference from an adjacent cell may cause frequent errors in receiving data with the transmission mode configured for each terminal 200. In this case, control section 102 generates allocation control information in the format (DCI 0/1A) common to all the terminals and transmits data in a robust default transmission mode. As a result, robust data transmission is allowed even if a propagation environment is abruptly changed.

Also, when upper-layer control information (i.e., RRC signaling) is transmitted for the notification of a transmission mode change under deteriorated conditions of a propagation path, control section 102 generates allocation control information (i.e., DCI 0/1A) common to all the terminals and transmits the information using the default transmission mode. The number of information bits of DCI 0/1A common to all the terminals is smaller than those of DCI 1, DCI 2, DCI 2A, DCI 0A, and DCI 0B which are dependent on the transmission mode. For this reason, if the same number of CCEs is set, DCI 0/1A can allow transmission at a lower coding rate than that related to DCI 1, DCI 2, DCI 2A, DCI 0A, and DCI 0B. Thus, use of DCI 0/1A in control section 102 under a deteriorated condition of a propagation path enables a terminal having a poor condition of a propagation path to receive allocation control information (and data) with a low error rate.

Control section 102 also generates allocation control information for a shared channel (for example, DCI 1C and 1A) for the allocation of data common to a plurality of terminals, such as broadcast and paging information, in addition to the allocation control information for the allocation of terminal-specific data.

From among the generated allocation control information for the allocation of terminal-specific data, control section 102 outputs MCS information and an NDI to PDCCH generating section 104, uplink resource allocation information to PDCCH generating section 104 and extracting section 117, and downlink resource allocation information to PDCCH generating section 104 and multiplexing section 109. Control section 102 also outputs the generated allocation control information for a shared channel to PDCCH generating section 104.

Search space configuration section 103 configures a search space based on the search space configuration rule associated with the configured resource region indicated by configuration information received from configuration section 101. Each search space configuration rule is stored as a table in memory included in search space configuration section 103. A search space includes a common search space (C-SS) and a unique search space (UE-SS) as described above. The common search space (C-SS) is a search space common to all the terminals, and the unique search space (UE-SS) is a search space specific to each terminal as described above.

Specifically, search space configuration section 103 configures preconfigured CCEs (for example, 16 CCEs'-worth of CCEs from the first CCE) as a C-SS. A CCE is a basic unit.

Search space configuration section 103 also configures a UE-SS for each terminal. For example, search space configuration section 103 determines a UE-SS for a certain terminal on the basis of the ID of the terminal, a CCE number obtained by calculations using a hash function for randomization, and the number of CCEs (L) that form a search space.

Figure 2:
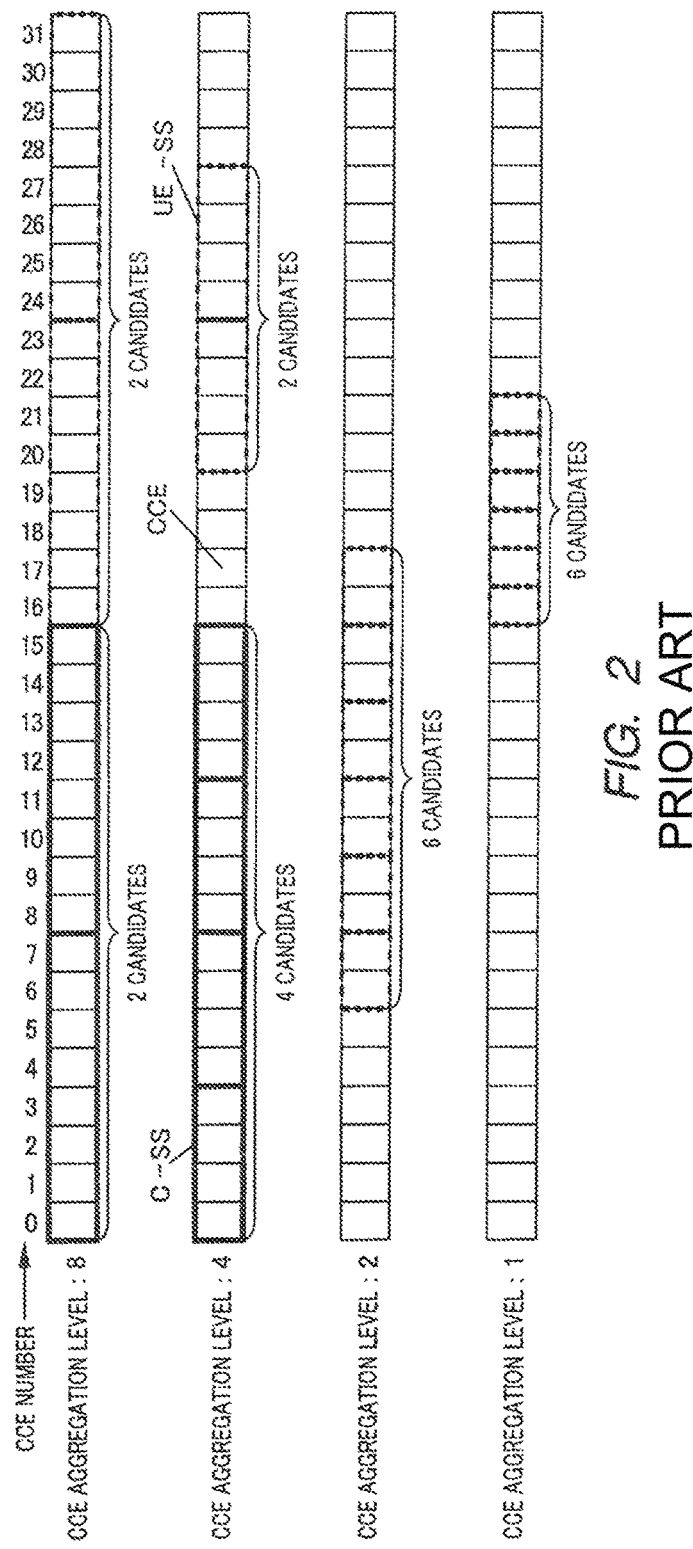
FIG. 2 is a diagram for explaining search spaces.
Figure 4:
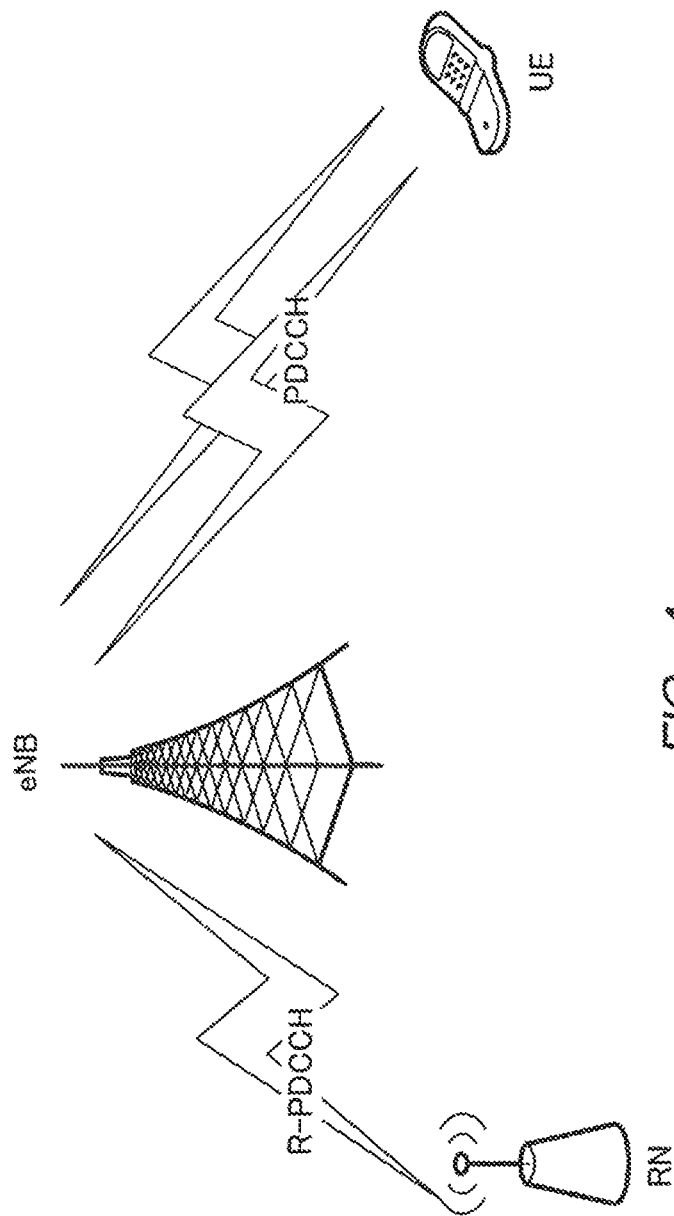
FIG. 4 is a diagram for explaining a communication system including a radio communication relay apparatus.
Figure 5:
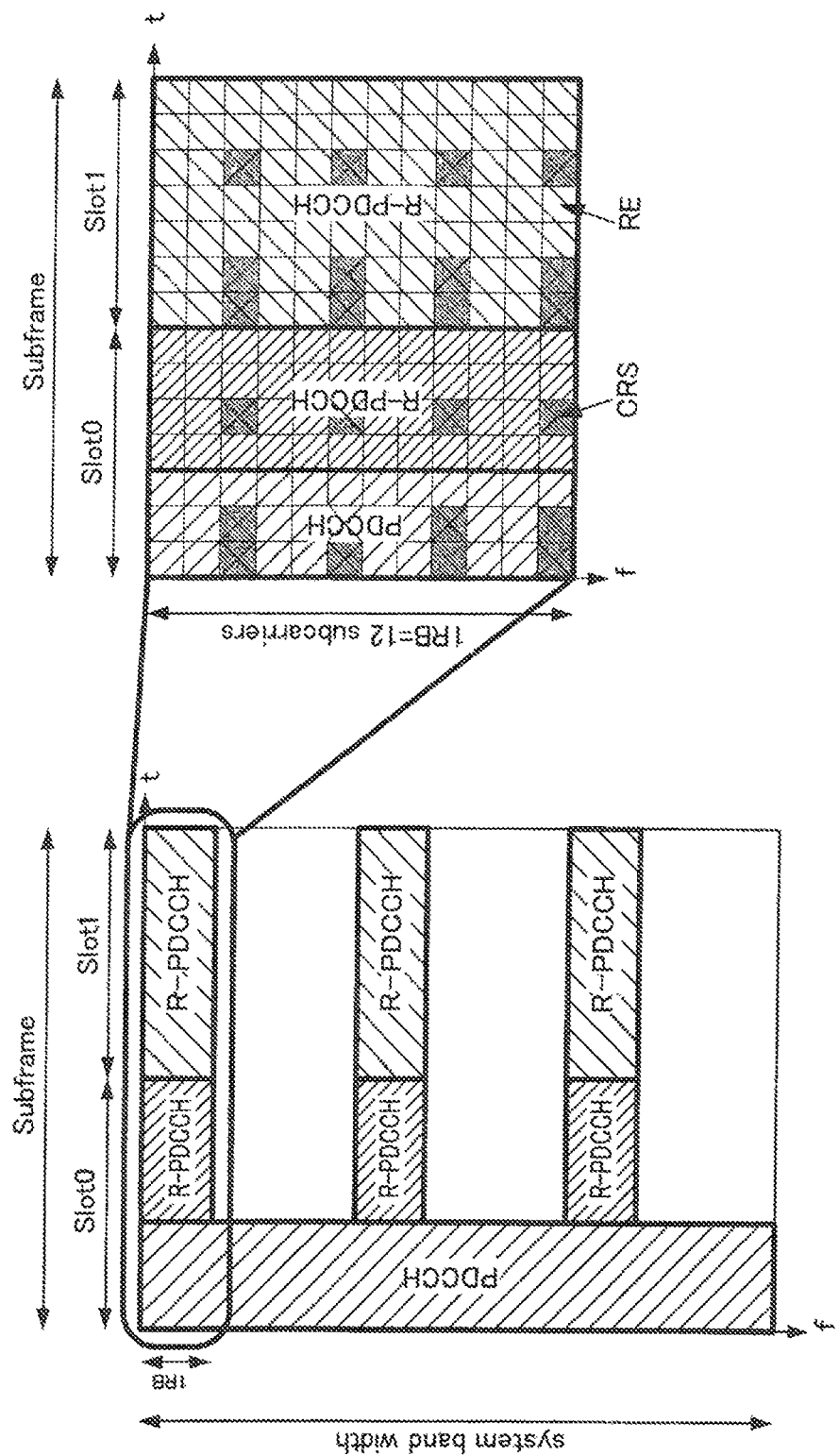
FIG. 5 illustrates an example of R-PDCCH regions.
Figure 6:
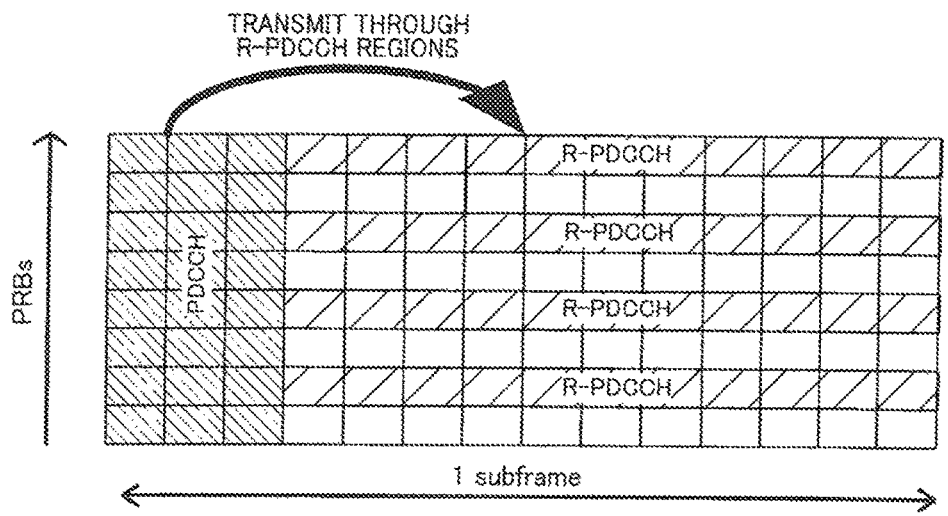
FIG. 6 is a diagram for explaining a mapping example of a PDCCH.

If a resource region configured by configuration section 101 is a PDCCH region, search space configuration section 103 configures a search space as shown in FIG. 2, for example. In other words, a pattern of the number of DCI allocation region candidates with respect to the CCE aggregation level in the search spaces shown in FIG. 2 is a search space configuration rule for when a resource region configured by configuration section 101 is a PDCCH region.

In FIG. 2, with respect to CCE aggregation level 4 for the PDCCH, four DCI allocation region candidates (i.e., CCEs 0 to 3, CCEs 4 to 7, CCEs 8 to 11, and CCEs 12 to 15) are configured as a C-SS. Also, with respect to CCE aggregation level 8 for the PDCCH, two DCI allocation region candidates (i.e., CCEs 0 to 7 and CCEs 8 to 15) are configured as a C-SS. In other words, in FIG. 2, a total of six DCI allocation region candidates are configured as C-SSs.

Furthermore, in FIG. 2, with respect to CCE aggregation level 1, six DCI allocation region candidates (i.e., each of CCEs 16 to 21) are configured as a UE-SS. With respect to CCE aggregation level 2, six DCI allocation region candidates (i.e., CCEs 6 to 17 divided into units of two each) are configured as a UE-SS. With respect to CCE aggregation level 4, two DCI allocation region candidates (i.e., CCEs 20 to 23 and CCEs 24 to 27) are configured as a UE-SS. With respect to CCE aggregation level 8, two DCI allocation region candidates (i.e., CCEs 16 to 23 and CCEs 24 to 31) are configured as a UE-SS. In other words, in FIG. 2, a total of sixteen DCI allocation region candidates are configured as UE-SSs.

Also, if the resource region configured by configuration section 101 is an R-PDCCH region in slot 0 or an R-PDCCH region in slot 1, search spaces are configured in accordance with a search space configuration rule corresponding to each. The search space configuration rule for the R-PDCCH region in slot 0 and the search space configuration rule for the R-PDCCH region in slot 1 will be described in detail, hereinafter.

PDCCH generating section 104 generates DCI including allocation control information received front control section 102 for the allocation of terminal-specific data (i.e., uplink resource allocation information, downlink resource allocation information, MCS information, an NDI, and/or the like for each terminal) or DCI including allocation control information for a shared channel (i.e., broadcast information, paging information, and other information common to terminals). In so doing, PDCCH generating section 104 adds CRC bits to the uplink allocation control information and the downlink allocation control information generated for each terminal and masks (or scrambles) the CRC bits with a terminal ID. PDCCH generating section 104 then outputs the masked signals to coding/modulating section 105.

Coding/modulating section 105 modulates the DCI received from PDCCH generating section 104 after channel coding and outputs the modulated signals to allocating section 108. Coding/modulating section 105 determines a coding rate set on the basis of channel quality indicator (CQI) information reported from each terminal so as to achieve a sufficient reception quality in each terminal. For example, as a distance between a terminal and a cell boundary decreases (i.e., as the channel quality of a terminal deteriorates), the coding rate to be set by coding/modulating section 105 decreases.

Allocating section 108 receives, from coding/modulating section 105, DCI including allocation control information for a shared channel and DCI including allocation control information for the allocation of terminal-specific data to each terminal. Then, allocating section 108 allocates the received DCI to each of CCEs or R-CCEs in a C-SS, or CCEs or R-CCEs in a UE-SS for each terminal in accordance with search space information received from search space configuration section 103.

For example, allocating section 108 selects one DCI allocation region candidate from a group of DCI allocation region candidates in a C-SS (for example, see FIG. 2). Allocating section 108 then allocates DCI including allocation control information for a shared channel to a CCE (or an R-CCE; hereinafter, sometimes simply referred to as "CCE" without distinguishing "CCE" from "R-CCE") in the selected DCI allocation region candidate.

In the case of a DCI format specific to the terminal (for example, DCI 1, DCI 1B, DCI 1D, DCI 2, DCI 2A, DCI 0A, or DCI 0B), allocating section 108 allocates a CCE in a UE-SS configured for the terminal to the DCI. On the other hand, if the DCI format intended for the terminal is a DCI format common to all the terminals (for example, DCI 0/1A), allocating section 108 allocates a CCE in a C-SS or a CCE in a UE-SS configured for the terminal to the DCI.

The CCE aggregation level to be allocated to one DCI item depends on the coding rate and the number of DCI bits (namely, the amount of allocation control information). For example, because the coding rate of DCI intended for a terminal located around a cell boundary is set low, more physical resources are required. Accordingly, allocating section 108 allocates more CCEs to DCI for a terminal located around a cell boundary.

Allocating section 108 then outputs information about the CCEs allocated to the DCI to multiplexing section 109 and ACK/NACK receiving section 120. Allocating section 108 outputs the coded/modulated DCI to multiplexing section 109.

Coding/modulating section 106 modulates the configuration information received from configuration section 101 after channel coding and outputs the modulated configuration information to multiplexing section 109.

Coding/modulating section 107 modulates the input transmission data (downlink data) after channel coding and outputs the modulated transmission data signals to multiplexing section 109.

Multiplexing section 109 multiplexes the coded/modulated DCI signal received from allocating section 108, the configuration information received from coding/modulating section 106, and the data signals (namely, PDSCH signals) input from coding/modulating section 107 in the time domain and the frequency domain. Multiplexing section 109 maps the PDCCH signals and the data signals (PDSCH signals) on the basis of the downlink resource allocation information received from control section 102. Multiplexing section 109 may also map the configuration information onto the PDSCH. Multiplexing section 109 then outputs the multiplexed signals to IFFT section 110.

IFFT section 110 converts the multiplexed signals from multiplexing section 109 for each antenna into a time waveform. CP adding section 111 adds a CP to the time waveform to obtain OFDM signals.

RF transmitting section 112 performs radio processing for transmission (for example, up-conversion or digital-analog (D/A) conversion) on the OFDM signals input from CP adding section 111 and transmits the resultant signals via antenna 113.

RF receiving section 114 also performs radio processing for reception (for example, down-conversion or analog-digital (A/D) conversion) on radio signals received via antenna 113 at a receiving band and outputs the resultant received signals to CP removing section 115.

CP removing section 115 removes the CP from the received signals and fast Fourier transform (FFT) section 116 converts the received signals from which the CP is removed into frequency domain signals.

Extracting section 117 extracts uplink data from the frequency domain signals received from FFT section 116 on the basis of uplink resource allocation information received from control section 102. IDFT section 118 converts the extracted signals into time domain signals and outputs the time domain signals to data receiving section 119 and ACK/NACK receiving section 120.

Data receiving section 119 decodes the time domain signals input from IDFT section 118. Data receiving section 119 then outputs decoded uplink data as received data.

ACK/NACK receiving section 120 extracts, from the time domain signals received from IDFT section 118, ACK/NACK signals from each terminal for the downlink data (PDSCH signals). Specifically, ACK/NACK receiving section 120 extracts the ACK/NACK signals from an uplink control channel (e.g., a Physical Uplink Control Channel (PUCCH) on the basis of the information received from allocating section 108. The uplink control channel is associated with the CCEs used for the transmission of the downlink allocation control information corresponding to the downlink data.

ACK/NACK receiving section 120 then determines the ACK or NACK of the extracted ACK/NACK signals.

One reason that the CCEs and the PUCCH are associated with each other is to obviate the need for signaling sent by the base station to notify each terminal of a PUCCH for use in transmitting ACK/NACK signals from the terminal, which thereby allows downlink communication resources to be used efficiently. Consequently, in accordance with this association, each terminal determines a PUCCH for use in transmitting ACK/NACK signals on the basis of the CCEs to which downlink allocation control information (DCI) for the terminal is mapped.

(Configuration of Terminal 200)

Figure 10:
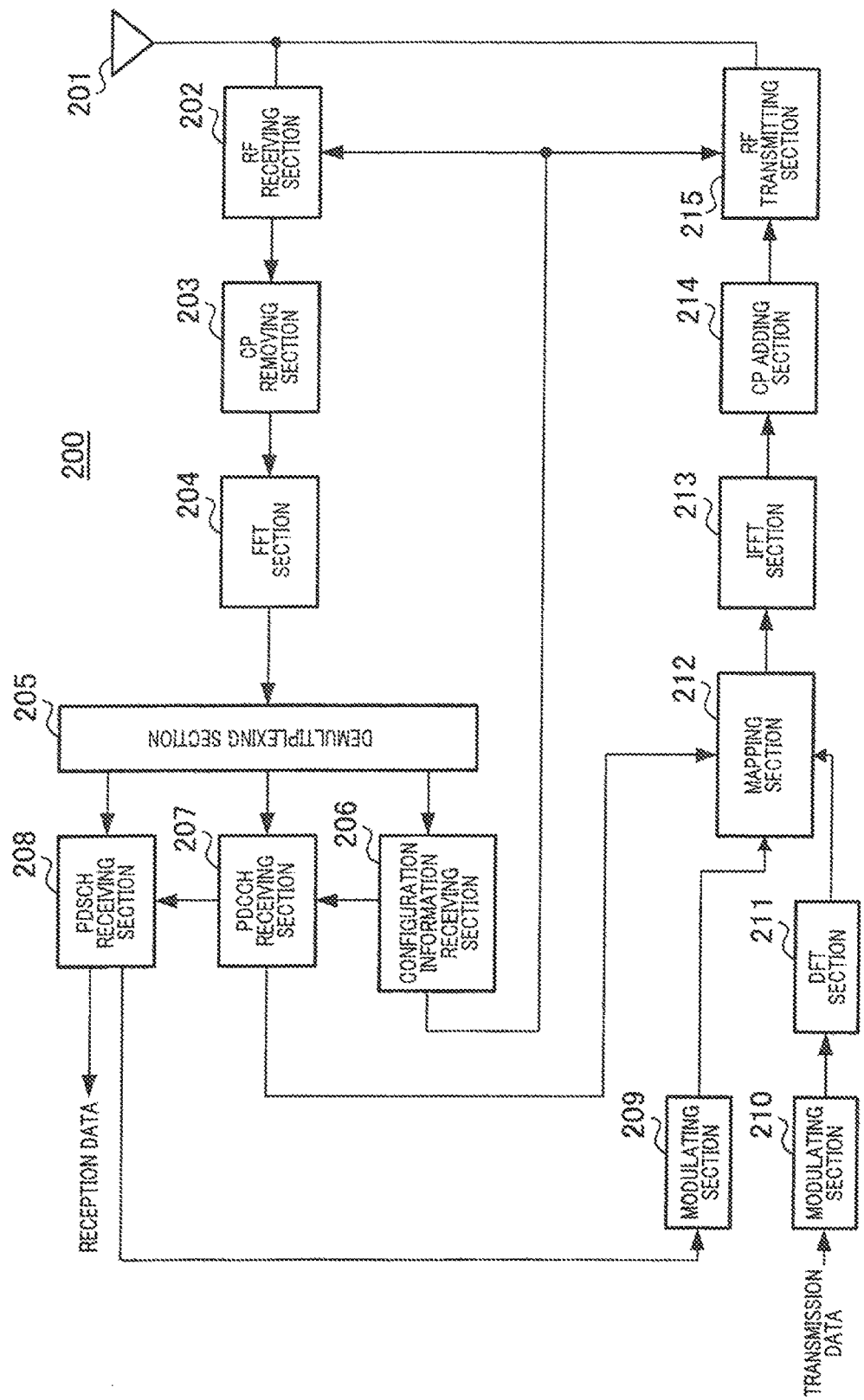
FIG. 10 is a block diagram illustrating the configuration of the terminal according to Embodiment 1 of the claimed invention.

FIG. 10 is a block diagram illustrating the configuration of terminal 200 according to Embodiment 1 of the claimed invention. Terminal 200 is an LTE-A terminal, receives data signals (i.e., downlink data) through a plurality of downlink unit carriers, and transmits ACK/NACK signals for the data signals to base station 100 via a PUCCH for one uplink unit carrier.

In FIG. 10, terminal 200 includes antenna 201, RF receiving section 202, CP removing section 203, FFT section 204, demultiplexing section 205, configuration information receiving section 206, PDCCH receiving section 207, PDSCH receiving section 208, modulating sections 209 and 210, DFT section 211, mapping section 212, IFFT section 213, CP adding section 214, and RF transmitting section 215.

RF receiving section 202 sets a reception band on the basis of band information received from configuration information receiving section 206. RF receiving section 202 performs radio processing for reception (e.g., down-conversion or analog-digital (A/D) conversion) on radio signals (OFDM signals in this case) received via antenna 201 in the reception band and outputs the resultant received signals to CP removing section 203. The received signals may include a PDSCH signal, DCI, and upper layer control information including configuration information. The DCI (allocation control information) is allocated to a common search space (C-SS) configured for terminal 200 and other terminals or to a unique search space (UE-SS) configured for terminal 200.

CP removing section 203 removes a CP from the received signals and FFT section 204 converts the received signals from which the CP is removed into frequency domain signals. The frequency domain signals are output to demultiplexing section 205.

Demultiplexing section 205 outputs to PDCCH receiving section 207, from signals received from FFT section 204, a component that may include DCI (i.e., signals extracted from a PDCCH region and an R-PDCCH region). Demultiplexing section 205 also outputs upper layer control signals (e.g., RRC signaling) including configuration information to configuration information receiving section 206 and data signals (i.e., PDSCH signals) to PDSCH receiving section 208. If the upper layer control signals including the configuration information are transmitted through a PDSCH, demultiplexing section 205 extracts the configuration information from the signals received by PDSCH receiving section 208.

Configuration information receiving section 206 reads the following information from the upper layer control signals received from demultiplexing section 205. In other words, the information to be read includes: information indicating uplink and downlink unit carriers set for the terminal, information indicating a terminal ID set for the terminal, information indicating a resource region configured for the terminal for use in transmitting DCI, information indicating a reference signal set for the terminal, and information indicating a transmission mode configured for the terminal.

The information indicating uplink and downlink unit carriers set for the terminal is output to PDCCH receiving section 207, RF receiving section 202 and RF transmitting section 215 as band information. The information indicating a terminal ID set for the terminal is output to PDCCH receiving section 207 as terminal ID information. The information indicating a resource region for use in transmitting DCI is output to PDCCH receiving section 207 as search space region information. The information indicating a reference signal set for the terminal is output to PDCCH receiving section 207 as reference signal information. The information indicating a transmission mode configured for the terminal is output to PDCCH receiving section 207 as transmission mode information.

PDCCH receiving section 207 blind-decodes (monitors) the signals input from demultiplexing section 205 to obtain DCI for the terminal. The blind decoding is performed on unit region candidates targeted for decoding, specified in the search space configuration rule associated with a resource region configured for the terminal. Each search space configuration rule is saved as a table in memory included in PDCCH receiving section 207. PDCCH receiving section 207 performs blind-decoding for a DCI format for the allocation of data common to all the terminals (for example, DCI 0/1A), a DCI format dependent on the transmission mode configured for the terminal (for example, DCI 1, DCI 2, DCI 2A, DCI 0A, and DCI 0B), and a DCI format for the allocation of a shared channel common to all the terminals (for example, DCI 1C and DCI 1A). This operation creates DCI including allocation control information on the DCI formats.

If a region indicated by search space region information received from configuration information receiving section 206 is a PDCCH region, PDCCH receiving section 207 performs, with respect to a C-SS, blind-decoding for the DCI formats for shared channel allocation (DCI 1C and DCI 1A) and the DCI format for the allocation of data common to all the terminals (DCI 0/1A) on the basis of the search space configuration rule for when the resource region is a PDCCH region. Specifically, for each unit region candidate targeted for decoding in a C-SS (i.e., candidates of a CCE region allocated to terminal 200), PDCCH receiving section 207 performs demodulation and decoding based on the size of the DCI format for shared channel allocation and the size of the DCI format for the allocation of data common to all the terminals. For the decoded signals, PDCCH receiving section 207 demasks CRC bits with an ID common to a plurality of terminals. PDCCH receiving section 207 then determines signals for which "CRC=OK" (i.e. no error) is returned as a result of the demasking to be DCI including allocation control information for a shared channel. For the decoded signals, PDCCH receiving section 207 further demasks the CRC hits with the ID of the terminal indicated by the terminal ID information. PDCCH receiving section 20 then determines signals for which "CRC=OK" (i.e. no error) is returned as a result of the demasking to be DCI including allocation control information for the terminal. In other words, in a C-SS, PDCCH receiving section 20 determines by means of a terminal ID (i.e., an ID common to a plurality of terminals or the ID of terminal 200) whether allocation control information of DCI 0/1A is for a shared channel or for the allocation of data to the terminal.

PDCCH receiving section 207 calculates a UE-SS for the terminal for CCE aggregation level with the terminal ID indicated by the terminal ID information received from configuration information receiving section 206. For each blind decoding region candidate in the obtained UE-SS, PDCCH receiving section 207 then performs demodulation and decoding based on the size of the DCI format corresponding to the transmission mode configured for the terminal (the transmission mode indicated by the transmission mode information) and the size of the DCI format common to all the terminals (DCI 0/1A). For the decoded signals, PDCCH receiving section 207 demasks CRC bits with the ID of the terminal. PDCCH receiving section 207 determines signals for which "CRC=OK" (i.e. no error) is returned as a result of demasking to be DCI for the terminal.

Even if the region indicated by the search space region information received from configuration information receiving section 206 is an R-PDCCH region in slot 0 or an R-PDCCH region in slot 1, PDCCH receiving section 207 also performs blind decoding on the basis of the search space configuration rule corresponding to each region. The search space configuration rule for an R-PDCCH region in slot 0 and the search space configuration rule for an R-PDCCH region in slot 1 will be described in detail hereinafter. If no search space region information (i.e., search space allocation) is received from configuration information receiving section 206 (i.e., if base station 100 transmits no search space region information), terminal 200 may perform blind decoding without considering the allocation of search spaces.

Upon reception of downlink allocation control information, PDCCH receiving section 207 outputs downlink resource allocation information in the DCI for the terminal to PDSCH receiving section 208. Upon reception of uplink allocation control information, PDCCH receiving section 207 outputs uplink resource allocation information to mapping section 212. PDCCH receiving section 207 also outputs the CCE number for the CCE used for the transmission of the DCI for the terminal (i.e., CCE used for the transmission of the signals for which "CRC=OK") to mapping section 212 (CCE number for the leading CCE if the CCE aggregation level is plural). The details of blind decoding (monitoring) in the PDCCH receiving section will be described hereinafter.

PDSCH receiving section 208 extracts received data (i.e., downlink data) from the PDSCH signals from demultiplexing section 205 on the basis of the downlink resource allocation information received from PDCCH receiving section 207. PDSCH receiving section 208 also detects any error in the extracted received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals. The ACK/NACK signals are output to modulating section 209.

Modulating section 209 modulates the ACK/NACK signals received from PDSCH receiving section 208 and outputs the modulated ACK/NACK signals to mapping section 212.

Modulating section 210 modulates transmission data (i.e., uplink data) and outputs the modulated data signal to DFT section 211.

DFT section 211 converts the data signals received from modulating section 210 into the frequency domain and outputs a plurality of resultant frequency components to mapping section 212.

Mapping section 212 maps the frequency components received from DFT section 211 to a PUSCH included in the uplink unit carrier in accordance with the uplink resource allocation information received from PDCCH receiving section 207. Mapping section 212 also identifies a PUCCH in accordance with the CCE number received from PDCCH receiving section 207. Mapping section 212 then maps the ACK/NACK signals input from modulating section 209 to the identified PUCCH.

IFFT section 213 converts the plurality of frequency components mapped to the PUSCH into a time domain waveform. CP adding section 214 adds a CP to the time domain waveform.

RF transmitting section 215 can vary the transmission band. RP transmitting section 215 determines a specific transmission band on the basis of the band information received from configuration information receiving section 206. RF transmitting section 215 then performs transmission radio processing (for example, up-conversion or digital-analog (D/A) conversion) on the CP-added signals and transmits the resultant signals via antenna 201.

(Operations of Base Station 100 and Terminal 200)

Configuration section 101 of base station 100 configures a resource region used for the transmission of DCI for terminal 200. Candidates of the resource region to be configured include a PDCCH region, an R-PDCCH region in slot 0, and an R-PDCCH region in slot 1.

Search space configuration section 103 configures a search space on the basis of the search space configuration rule associated with the configured resource region indicated by configuration information received from configuration section 101. A "first search space configuration rule" that is used when the resource region is an R-PDCCH region in slot 0 and a "second search space configuration rule" that is used when the resource region is an R-PDCCH region in slot 1 have mutually different patterns regarding the number of unit region candidates targeted for decoding with respect to CCE aggregation level. So other words, for the R-PDCCH region in slot 0 and the R-PDCCH region in slot 1, patterns regarding the number of unit region candidates targeted for decoding with respect to CCE aggregation level are defined independently.

Variations of the "first search space configuration rule" and the "second search space configuration rule" are described below.

<Variation 1 of Search Space Configuration Rule>

Figure 11:
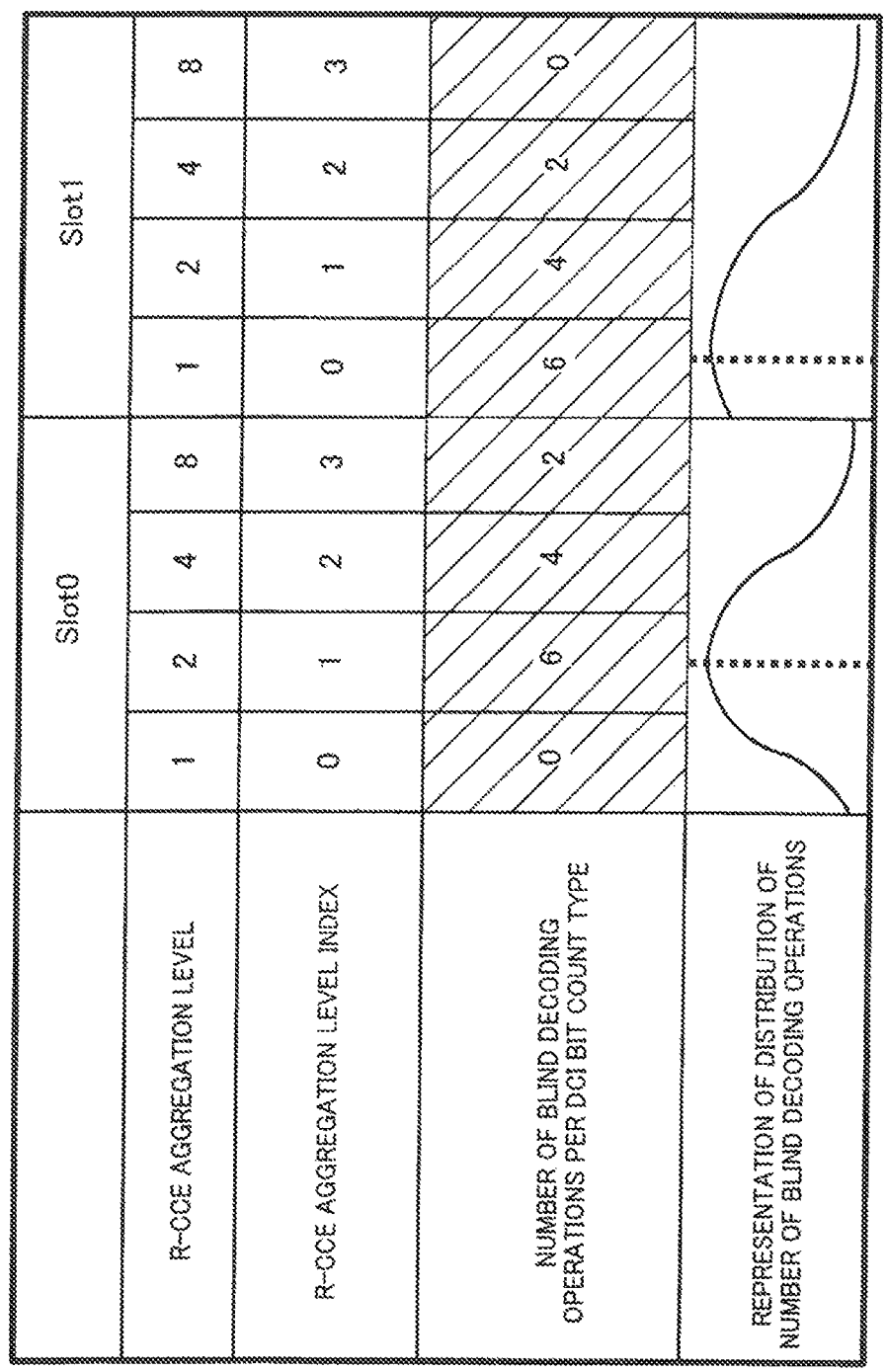
FIG. 11 is a diagram illustrating variation 1 of a search space configuration rule.
Figure 12:
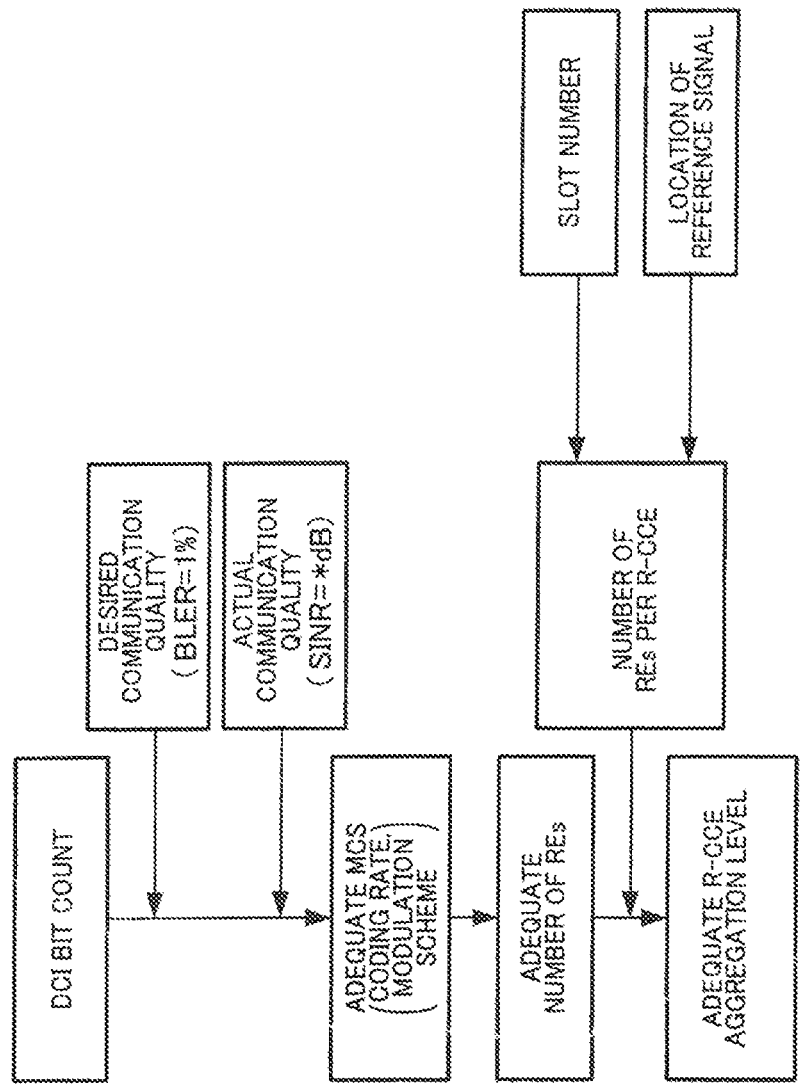
FIG. 12 is a diagram illustrating a method of calculating an adequate R-CCE aggregation level.

FIG. 11 is a diagram illustrating variation 1 of a search space configuration rule. As shown in FIG. 11, the pattern of the first search space configuration rule is a pattern where the numbers of unit region candidates targeted for decoding are 0, 6, 4, and 2 for CCE aggregation levels 1, 2, 4, and 8, respectively. On the other hand, the pattern of the second search space configuration rule is a pattern where the numbers of unit region candidates targeted for decoding are 6, 4, 2, and 0 for CCE aggregation levels 1, 2, 4, and 8, respectively, As shown in FIG. 12, base station 100 determines an adequate MCS (i.e., an adequate coding rate) so as to adequately achieve the desired communication quality (for example, in LTE, "BLER=1% or less" is specified for a PDCCH) with the number of DCI bits to be transmitted to terminal 200 being based on actual communication quality (for example, SINR=*dB). Based on the number of DCI bits and the adequate coding rate, base station 100 then calculates what number of REs would be adequate and also calculates an adequate R-CCE aggregation level based on the number of REs per R-CCE, which varies for each slot or for each reference signal location. The modulation scheme of R-PDCCH is QPSK.

As shown in FIG. 13, the number of REs forming one R-CCE differs between slot 0 and slot 1. In FIG. 13, those marked "*1" correspond to 3GPP TS36.211 V9.1.0, and those marked "*2" correspond to 3GPP TS36.814 V9.0.0. Specifically, the number of REs forming an R-CCE of R-PDCCH in slot 0 is less than the number of REs forming an R-CCE of R-PDCCH in slot 1.

Accordingly, as shown in FIG. 14, in order to obtain an adequate number of REs, the R-CCE aggregation level would have to be made relatively greater for slot 0, which has a smaller number of REs per R-CCE, as compared to slot 1, which has a greater number of REs per R-CCE.

This requirement is met by variation 1 of the search space configuration rule mentioned above. In other words, in variation 1 of the search space configuration rule, the patterns of the first search space configuration rule and the second search space configuration rule are determined in accordance with the number of REs per R-CCE. The peak position (i.e., the center of weight) of the distribution of unit region candidate groups targeted for decoding contained in the search space with respect to R-CCE aggregation level is located towards greater R-CCE aggregation levels for the pattern of the first search space configuration rule than it is for the pattern of the second search space configuration rule.

The fact that "for the pattern of the first search space configuration rule, the peak position of the distribution of unit region candidate groups targeted for decoding with respect to R-CCE aggregation level is shifted towards greater CCE aggregation levels than it is for the pattern of the second search space configuration rule" signifies the matters below.

<Matter 1> It signifies that the weighted average of the number of REs per R-CCE aggregation level with respect to the number of blind decoding operations is greater for the first search space configuration rule than it is for the second search space configuration rule. A number is represented by '#' in the following equations. The weighted average of the number REs per R-CCE aggregation level with respect to the number of blind decoding operations (i.e., the number of unit region candidates targeted for decoding) is represented by Equation (1) below:

[Eq. 1]

$$X_{Slot\#n} = \frac{\sum_{R\text{-}CCE\ aggregation\ level} \left( \begin{array}{c} (\#\ of\ REs\ per\ R\text{-}CCE\ agg.\ level) \times \\ (\#\ of\ blind\ decoding\ operations) \end{array} \right)}{\sum_{R\text{-}CCE\ aggregation\ level} (\#\ of\ blind\ decoding\ operations)} \quad (1)$$

Equation (1) may be modified as in Equation (2) below.

[Eq. 2]

$$X_{Slot\#n} = \frac{\sum_{R\text{-}CCE\ aggregation\ level} \left( \begin{array}{c} (\#\ of\ REs\ per\ R\text{-}CCE\ agg.\ level) \times \\ (\#\ of\ blind\ decoding\ operations) \end{array} \right)}{\sum_{R\text{-}CCE\ aggregation\ level} (\#\ of\ blind\ decoding\ operations)} \quad (2)$$

$$= (\#\ of\ REs\ per\ R\text{-}CCE) \cdot$$

$$\frac{\sum_{R\text{-}CCE\ aggregation\ level} \left( \begin{array}{c} (R\text{-}CCE\ agg.\ level) \times \\ (\#\ of\ blind \\ decoding\ operations) \end{array} \right)}{\sum_{R\text{-}CCE\ aggregation\ level} (\#\ of\ blind\ decoding\ operations)}$$

$$= (\#\ of\ REs\ per\ R\text{-}CCE) \cdot (\text{weighted } avg.\ of\ R\text{-}CCE\ agg.$$

levels with respect to# of blind decoding operations)

Accordingly, the weighted average of the number of REs per R-CCE aggregation level with respect to the number of blind decoding operations may also be described as the product obtained by multiplying the number of REs per R-CCE with the weighted average of R-CCE aggregation levels with respect to the number of blind decoding operations.

<Matter 2> It signifies that the R-CCE aggregation level at which the number of unit region candidates targeted for decoding is greatest for the first search space configuration rule is greater than it is for the second search space configuration role. If there are a plurality of R-CCE aggregation levels at which the number of unit region candidates targeted for decoding is greatest, it signifies that the average value of the R-CCE aggregation levels at which the number of unit region candidates targeted for decoding is greatest is greater for the first search space configuration rule than it is for the second search space configuration rule.

<Matter 3> It signifies that the weighted average of R-CCE aggregation levels with respect to the number of blind decoding operations is greater for the first search space configuration rule than it is for the second search space configuration rale.

<Matter 4> It signifies that the weighted average of R-CCE aggregation level indices with respect to the number of blind decoding operations is greater for the first search space configuration rule than it is for the second search space configuration rule. R-CCE aggregation level indices are numbered 0, 1, 2, 3 in ascending order of R-CCE aggregation level. With respect to R-CCE aggregation levels 1, 2, 4, and 8, their R-CCE aggregation level indices are defined as 0, 1, 2, and 3, respectively.

Assuming that the number of REs per R-CCE is 44 in slot 0 and 72 in slot 1, whether or not the above-mentioned <Matter 1> to <Matter 4> are satisfied may specifically be confirmed as follows.

<Matter 1>

The weighted average of the number of REs per R-CCE aggregation level with respect to the number of blind decoding operations is $(44 \times 0 + 88 \times 6 + 176 \times 4 + 352 \times 2)/(0 + 6 + 4 + 2) \approx 161$ for the first search space configuration rule, and $(72 \times 6 + 144 \times 4 + 288 \times 2 + 576 \times 0)/(6 + 4 + 2 + 0) = 132$ for the second search space configuration rule. Thus, the relationship "first search space configuration rule>second search space configuration rule" is satisfied.

<Matter 2>

The R-CCE aggregation level at which the number of blind decoding operations becomes greatest is 2 for the first search space configuration rule, and 1 for the second search space configuration rule. Thus, the relationship "first search space configuration rule>second search space configuration rule" is satisfied.

<Matter 3>

The weighted average of R-CCE aggregation levels with respect to the number of blind decoding operations is $(1 \times 0 + 2 \times 6 + 4 \times 4 + 8 \times 2)/(0 + 6 + 4 + 2) \approx 3.67$ for the first search space configuration rule, and $(1 \times 6 + 2 \times 4 + 4 \times 2 + 8 \times 0)/(6 + 4 + 2 + 0) \approx 1.83$ for the second search space configuration rule. Thus, the relationship "first search space configuration rule>second search space configuration rule" is satisfied.

<Matter 4>

The weighted average of R-CCE aggregation level indices with respect to the number of blind decoding operations is $(0 \times 0 + 1 \times 6 + 2 \times 4 + 3 \times 2)/(0 + 6 + 4 + 2) \approx 1.67$ for the first search space configuration rule, and $(0 \times 6 + 1 \times 4 + 2 \times 2 + 3 \times 0)/(6 + 4 + 2 + 0) \approx 0.67$ for the second search space configuration rule. Thus, the relationship "first search space configuration ride>second search space configuration rule" is satisfied.

In expanding the PDCCH region to the R-PDCCH region as well, if one were to simply expand it, the number of blind decoding operations in terminal 200 would increase, consequently causing the circuit size of terminal 200 to become bigger. If a search space as defined in LTE is configured for each of the PDCCH region, the R-PDCCH region in slot 0, and the R-PDCCH region in slot 1, the number of blind decoding operations in terminal 200 could be as high as 180 times (=60 (PDCCH region)+60 (R-PDCCH region in slot 0)+60 (R-PDCCH region in slot 1)).

On the other hand, if one were to simply reduce the number of unit region candidates targeted for decoding, the probability that all are used by other terminals and relay stations would become higher, causing the blocking probability to rise.

In contrast by using variation 1 of the search space configuration rule, efficient DCI transmission using an adequate number of RE groups for satisfying the desired communication quality becomes possible. As a result, it also becomes possible to prevent the blocking probability from becoming high. This effect is common to all the variations discussed hereinafter.

Furthermore, in the example provided for variation 1 of the search space configuration rule, the number of unit region candidates targeted for decoding is reduced compared to the search space in LTE. Thus, it is possible to prevent the circuit size of terminal 200 front becoming larger. In other words, in each of the variations described below, by reducing the number of unit region candidates targeted for decoding as compared to the search space in LTE, similar effects may be attained.

<Variation 2 of Search Space Configuration Rule>

FIG. 15 is a diagram illustrating variation 2 of the search space configuration rule. As shown in FIG. 15, the pattern of the first search space configuration rule is a pattern where, for CCE aggregation levels 1, 2, 4, and 8, the numbers of unit region candidates targeted for decoding are 6, 6, 2, and 2, respectively. In other words, here, by way of example, the same pattern as that of the search space configuration rule used for the PDCCH region is employed. On the other hand, the pattern of the second search space configuration rule is a pattern where, for CCE aggregation levels 1, 2, 4, and 8, the numbers of unit region candidates targeted for decoding are 6, 2, 2, and 2 (or 0), respectively.

Considering FIG. 13 in terms of slot 1, the number of REs per R-CCE in slot 1 is approximately twice the number of REs per R-CCE in slot 0. As such, in variation 2, the pattern of the second search space configuration rule is formed by simply shifting the pattern of the first search space configuration rule towards lesser R-CCE aggregation levels. In so doing, the number of unit region candidates targeted for decoding for R-CCE aggregation level=8 of the second search space configuration rule may be the smallest number of unit region candidates targeted for decoding prior to shifting (=2), or it may be that no unit region candidate targeted for decoding is allocated (i.e., number of unit region candidates targeted for decoding =0).

<Variation 3 of Search Space Configuration Rule>

FIG. 16 is a diagram illustrating variation 3 of the search space configuration rale. As shown in FIG. 16, the pattern of the first search space configuration rule is a pattern where, for CCE aggregation levels 1, 2, 4, and 8, the numbers of unit region candidates targeted for decoding are 6, 6, 2, and 2, respectively. In other words, here, by way of example, the same pattern as that of the search space configuration rule used for the PDCCH region is employed. On the other hand, the pattern of the second search space configuration rule is a pattern where, for CCE aggregation levels 1, 2, 4, and 8, the numbers of unit region candidates targeted for decoding are 8, 3, 3, and 2, respectively.

In other words, the pattern of the second search space configuration rule of variation 3 is formed by allocating to the pattern of the second search space configuration rule of variation 2 the amount by which the number of unit region candidates targeted for decoding has decreased between the first search space configuration role and the second search space configuration rule of variation 2 (i.e., 4). Specifically, in FIG. 16, in order to weight the R-CCE aggregation level with the greatest number of unit region candidates targeted for decoding, the amount by which the number of unit region candidates targeted for decoding has decreased is allocated to CCE aggregation levels 1, 2, 4, and 8 according to the allocation pattern +2, +1, +1, +0.

If, for example, allocation is to he carried out evenly, the amount by which the number of unit region candidates targeted for decoding has decreased may be allocated to R-CCE aggregation levels 1, 2, 4, and 8 according to the allocation pattern +1, +1, +1, +1, respectively. Alternatively, the weighting method may be altered so that the amount by which the number of unit region candidates targeted for decoding has decreased is allocated according to the allocation pattern +4, +0, +0, +0, for example.

<Variation 4 of Search Space Configuration Rule>

FIG. 17 is a diagram illustrating variation 4 of the search space configuration rule. As shown in FIG. 17, the pattern of the first search space configuration rule is a pattern where, for CCE aggregation levels 1, 2, 4, and 8, the numbers of unit region candidates targeted for decoding are 2 (or 0), 6, 6, and 2, respectively. On the other hand, the pattern of the second search space configuration rule is a pattern where, for CCE aggregation levels 1, 2, 4, and 8, the numbers of unit region candidates targeted for decoding are 6, 6, 2, and 2, respectively. In other words, here, by way of example, the same pattern as that of the search space configuration rule used for the PDCCH region is employed.

Considering FIG. 13 in terms of slot 0, the number of REs per R-CCE in slot 0 is approximately ½ of the number of REs per R-CCE in slot 1. As such, in variation 4, the pattern of the first search space configuration rule is formed by simply shifting the pattern of the second search space configuration rule towards greater R-CCE aggregation levels. In so doing, the number of unit region candidates targeted for decoding for R-CCE aggregation level=1 of the first search space configuration rule may be the smallest number of unit region candidates targeted for decoding prior to shifting (=2), or it may be that no unit region candidate targeted for decoding is allocated (i.e., number of unit region candidates targeted for decoding 0).

<Variation 5 of Search Space Configuration Rule>

FIG. 18 is a diagram illustrating variation 5 of the search space configuration rule. As shown in FIG. 18, the pattern of the first search space configuration rule is a pattern where, for CCE aggregation levels 1, 2, 4, and 8, the numbers of unit region candidates targeted for decoding are 0, 7, 7, and 2, respectively. On the other hand, the pattern of the second search space configuration rule is a pattern where, for CCE aggregation levels 1, 2, 4, and 8, the numbers of unit region candidates targeted for decoding are 6, 6, 2, and 2, respectively. In other words, here, by way of example, the same pattern as that of the search space configuration rule used for the PDCCH region is employed.

In other words, the pattern of the first search space configuration rule of variation 5 is formed by allocating to the pattern of the first search space configuration rule of variation 4 the amount by which the number of unit region candidates targeted for decoding has decreased between the first search space configuration rule and the second search space configuration rule of variation 4 (i.e., 2). Specifically, in FIG. 18, in order to weight the R-CCE aggregation level with the greatest number of unit region candidates targeted for decoding, the amount by which the number of unit region candidates targeted for decoding has decreased is allocated to CCE aggregation levels 1, 2, 4, and 8 according to the allocation pattern +0, +1, +1, +0.

Allocating section 108 allocates the DCI to unit region candidates targeted for decoding indicated by the search space information from search space configuration section 103. The DCI is thus transmitted to terminal 200.

In terminal 200, if the region indicated by the search space region information received from configuration information receiving section 206 is an R-PDCCH region in slot 0 or an R-PDCCH region in slot 1, PDCCH receiving section 20 performs blind decoding on the basis of the search space configuration rule corresponding to each. These rules correspond to the above-described rules adopted in base station 100.

According to the present embodiment, search space configuration section 103 of base station 100, as described above, configures a search space based on the search space configuration rule corresponding to the R-PDCCH region of the slot to be configured. Allocating section 108 disposes DCI in any one of the plurality of unit region candidates targeted for decoding contained in the configured search space. A search space is composed of a plurality of unit region candidates targeted for decoding in terminal 200 and each unit region candidate targeted for decoding is composed of one or more concatenated R-CCEs (control channel elements).

In a search space configuration rule, corresponding numbers of unit region candidates targeted for decoding are respectively associated with a plurality of aggregation levels regarding CCEs. The first search space configuration rule for slot 0 and the second search space configuration rule for slot 1 have mutually different patterns regarding the numbers of unit region candidates targeted for decoding with respect to the plurality of aggregation levels regarding R-CCEs. In other words, patterns regarding the number of unit region candidates targeted for decoding with respect to R-CCE aggregation level are independently specified for the R-PDCCH region in slot 0 and the R-PDCCH region in slot 1.

Thus, DCI for terminal 200 under the control of base station 100 can be transmitted efficiently using R-PDCCH regions provided for DCI intended for relay stations.

In the pattern of the first search space configuration rule, the peak position of the distribution of unit region candidates targeted for decoding with respect to R-CCE aggregation level is located towards greater R-CCE aggregation levels as compared to the pattern of the second search space configuration rule.

Thus, efficient DCI transmission using an adequate number of RE groups to satisfy the desired communication quality becomes possible. Consequently, it is also possible to prevent the blocking probability from increasing.

In terminal 200, PDCCH receiving section 207 configures a search space based on the search space configuration rule and performs blind-decoding on each of the plurality of unit region candidates targeted for decoding that form the search space. Each unit region candidate targeted for decoding is composed, of one or more concatenated R-CCEs (control channel elements).

In a search space configuration rule, corresponding numbers of unit region candidates targeted for decoding are respectively associated with a plurality of aggregation levels regarding CCEs. The first search space configuration rule for slot 0 and the second search space configuration rule for slot 1 have mutually different patterns regarding the numbers of unit region candidates targeted for decoding with respect to the plurality of aggregation levels regarding R-CCEs. In other words, patterns regarding the number of unit region candidates targeted for decoding with respect to R-CCE aggregation level are independently specified for the R-PDCCH region in slot 0 and the R-PDCCH region in slot 1.

Thus, DCI for terminal 200 under the control of base station 100 can be received efficiently using R-PDCCH regions provided for DCI intended for relay stations.

In the description above, it was assumed that the numbers of REs per R-CCE were so related as to satisfy "slot 0<slot 1." However, by way of example, if an R-PDCCH region of one RB's width is divided into two in slot 1, the relationship may also be "slot 0>slot 1" instead. Accordingly, if "slot 0>slot 1," the terms slot 0 and slot 1 may be reversed in the description above. In essence, the embodiment deals with search space configuration rules for a first slot and a second slot, and it does not by any means impose any limitations as to which slots the first slot and the second slot are.

(Embodiment 2)

Embodiment 2 relates to another variation of the search space configuration rule. The base station and the terminal according to Embodiment 2 share the same basic configurations as those in Embodiment 1. Accordingly, a description will be provided referring back to FIGS. 9 and 10.

In base station 100 of Embodiment 2, configuration section 101 configures a resource region used for the transmission of DCI for terminal 200. Candidates to be configured as the resource region include a PDCCH region, an R-PDCCH region of slot 0, and an R-PDCCH region of slot 1.

Search space configuration section 103 configures a search space based on the search space configuration rule associated with a configuration resource region indicated by configuration information from configuration section 101. A search space configuration rule that is used when the resource region is an R-PDCCH region in slot 0 and a search space configuration rule that is used when -he resource region is an R-PDCCH region in slot 1 have mutually different patterns regarding the number of unit legion candidates targeted for decoding with respect to CCE aggregation level if the "coding rates" applied to slot 0 and slot 1 are different. In other words, the patterns regarding the number of unit region candidates targeted for decoding with respect to CCE aggregation level are independently specified for the R-PDCCH region in slot 0 and the R-PDCCH region in slot 1 on the basis of the "coding rate" of each slot. The term coding rate as referred to in Embodiment 2 and onward refers to a coding rate derived from the numbers of REs for the same R-CCE aggregation level (e.g., per R-CCE) in slot 0 and slot 1.

Here, the search space configuration rules used for a slot of a low coding rate and a slot of a high coding rate are referred to as "first search space configuration rule" and "second search space configuration rule," respectively.

Variations of the "first search space configuration rule" and the "second search space configuration rule" are described below.

<Variation 6 of Search Space Configuration Rule>

Figure 19:
FIG. 19 is a diagram illustrating variation 6 of a search space configuration rule.

FIG. 19 is a diagram illustrating variation 6 of the search space configuration rule. As shown in FIG. 19, when slot 0 has a higher coding rate than slot 1, the pattern of the first search space configuration rule is a pattern where, for CCE aggregation levels 1, 2, 4, and 8, the numbers of unit region candidates targeted for decoding are 8, 2, 2, and 0, respectively. On the other hand, the pattern of the second search space configuration rule is a pattern where, for CCE aggregation levels 1, 2, 4, and 8, the numbers of unit region candidates targeted for decoding are 0, 6, 4, and 2, respectively.

In this case, in order to obtain an adequate number of REs, if the requisite coding rate is high (i.e., low redundancy), the R-CCE aggregation levels need to be increased, whereas if the requisite coding rate is low (i.e., high redundancy), the R-CCE aggregation level needs to be decreased.

This requirement is met by variation 6 of the search space configuration rule mentioned above. Specifically, in variation 6 of the search space configuration rule, the patterns of the first search space configuration rule and the second search space con figuration rule are determined in accordance with the coding rate. Further, the peak position of the distribution of unit region candidate groups targeted for decoding contained in the search space with respect to R-CCE aggregation level is located towards lesser R-CCE aggregation levels for the pattern of the first search space configuration rule than it is for the pattern of the second search space configuration rule.

The fact that "the peak position of the distribution of unit region candidate groups targeted for decoding with respect to R-CCE aggregation level. Is shifted towards lesser CCE aggregation levels for the pattern of the first search space configuration rule than it is for the pattern of the second search space configuration rule" signifies the matters below.

<Matter 1> It signifies that the weighted average of the inverses of the coding rates (i.e., redundancies) for the second search space configuration rule with respect to the number of blind decoding operations becomes greater than it is for the first search space configuration rule. The weighted average of the inverses of coding rates (i.e., redundancies) with respect to the number of blind decoding operations (i.e., the number of unit region candidates targeted for decoding) is represented by Equation (3) below.

[Eq. 3]

$$X'_{Slot\#n} = \frac{\sum\limits_{R\text{-}CCE\ aggregation\ level} \left( \begin{array}{c} (\text{coding rate per } R\text{-}CCE\ agg.\ \text{level})^{-1} \times \\ (\#\ \text{of blind decoding opeartions}) \end{array} \right)}{\sum\limits_{R\text{-}CCE\ aggregation\ level} \#\ \text{of blind decoding operations}} \quad (3)$$

Equation (3) may be modified as in Equation (4) below.

[Eq. 4]

$$X'_{Slot\#n} = \frac{\sum\limits_{R\text{-}CCE\ aggregation\ level} \left( \begin{array}{c} (\text{coding rate per } R\text{-}CCE\ agg.\ \text{level})^{-1} \times \\ (\#\ \text{of blind decoding opeartions}) \end{array} \right)}{\sum\limits_{R\text{-}CCE\ aggregation\ level} \#\ \text{of blind decoding operations}} \quad (4)$$

$$= \left( \frac{(\#\ \text{of } DCI\ \text{bits})}{(\#\ \text{of } REs\ \text{per } R\text{-}CCE) \times (\text{mod. level})} \right).$$

(weighted *avg.* of *R-CCE agg.* levels with respect to# of blind decoding opeations)

Accordingly, the weighted average of the inverses of coding rates with respect to the number of blind decoding operations may also be described as the product obtained by multiplying the inverse of the coding rate per R-CCE with the weighted average of R-CCE aggregation levels with respect to the number of blind decoding operations.

<Matter 2> It signifies that the R-CCE aggregation level at which the number of unit region candidates targeted for decoding becomes greatest for the first search space configuration rule is lower than it is for the second search space configuration rule. If there are a plurality of R-CCE aggregation levels at which the number of unit region candidates targeted for decoding is greatest, it signifies that the average value of the R-CCE aggregation levels at which the number of unit region candidates targeted for decoding is greatest is lower for the first search space configuration rule than it is for the second search space configuration rule.

Matter 3> It signifies that the weighted average of R-CCE aggregation levels with respect to the number of blind decoding operations is lower for the first search space configuration rule than it is for the second search space configuration rule.

<Matter 4> It signifies that the weighted average of R-CCE aggregation level indices with respect to the number of blind decoding operations is lower for the first search space configuration rule than it is for the second search space configuration rule. R-CCE aggregation level Indices are numbered 0, 1, 2, 3 in ascending order of R-CCE aggregation level. With respect to R-CCE aggregation levels 1, 2, 4, and 8, their R-CCE aggregation level indices are defined as 0, 1, 2, and 3, respectively.

Assuming that the number of REs per R-CCE is 44 in slot 0 and 72 in slot 1, that the number of DCI bits is 56 bits in slot 0 and 42 bits in slot 1, and that the modulation level is QPSK, whether or not the above-mentioned <Matter 1> to <Matter 4> are satisfied may specifically be confirmed as follows.

<Matter 1>

The weighted average of the inverses of the coding rates with respect to the number of blind decoding operations is $(((56/(44\times2))^{\wedge}(-1))\times0+((56/(88\times2))^{\wedge}(-1))\times6+((56/(176\times2))^{\wedge}(-1))\times4+((56/(352\times2))^{\wedge}(-1))\times2)/(0+6+4+2)\approx5.76$ in slot 0, and is $(((42/(72\times2))^{\wedge}(-1))\times8+((42/(144\times2))^{\wedge}(-1))\times2+((42/(288\times2))^{\wedge}(-1))\times2+((42/(526\times2))^{\wedge}(-1))\times0)/(8+2+2+0)\approx5.71$ in slot 1. Thus, the relationship "first search space configuration rule<second search space configuration rule" is satisfied.

<Matter 2>

The R-CCE aggregation level at which the number of blind decoding operations becomes greatest is 2 for the second search space configuration rule, and 1 for the first search space configuration rule. Thus, the relationship "first search space configuration rule<second search space configuration rule" is satisfied.

<Matter 3>

The weighted average of R-CCE aggregation levels with respect to the number of blind decoding operations is $(1\times0+2\times6+4\times4+8\times2)/(0+6+4+2)\approx3.67$ for the first search space configuration rule, and $(1\times8+2\times2+4\times2+8\times0)/(8+2+2+0)\approx1.67$ for the first search space configuration rule. Thus, the relationship "first search space configuration rule<second search space configuration rule" is satisfied.

<Matter 4>

The weighted average of R-CCE aggregation level indices with respect to the number of blind decoding operations is $(0\times0+1\times6+2\times4+3\times2)/(0+6+4+2)\approx1.67$ for the first search space configuration rule, and $(0\times8+1\times2+2\times2+3\times0)/(8+2+2+0)\approx0.50$ for the first search space configuration rule. Thus, the relationship "first search space configuration rule<second search space configuration rule" is satisfied.

Allocating section 108 allocates the DCI to unit region candidates targeted for decoding indicated by the search space information from search space configuration section 103. The DCI is thus transmitted to terminal 200.

In terminal 200, if the region indicated by the search space region information received from configuration information receiving section 206 is an R-PDCCH region in slot 0 or an R-PDCCH region in slot 1, PDCCH receiving section 207 performs blind decoding on the basis of the search space configuration rule corresponding to each. These rules correspond to the above-described rules adopted in base station 100.

According to the present embodiment, search space configuration section 103 of base station 100, as described above, configures a search space based on the search space configuration rule corresponding to the R-PDCCH region of the slot to be configured.

If the coding rate configured for slot 1 is greater than the coding rate configured for slot 0, in the first search space configuration rule used for slot 0, the peak position of the distribution of unit region candidates targeted for decoding with respect to R-CCE aggregation level is located towards lesser R-CCE aggregation levels as compared to the pattern of the second search space configuration rule used for slot 1.

Thus, efficient DCI transmission using an adequate number of RE groups to satisfy the desired communication quality becomes possible. Consequently, it is also possible to prevent the blocking probability from increasing.

In the description above, it was assumed that the coding rates were so related as to satisfy "slot 0>slot 1." However, by way of example, if an R-PDCCH region of one RB's width is divided into two in slot 1, or if the number of DCI bits in slot 0 is less than that in slot 1 (e.g., if DCI format 1C is assigned to slot 0 so that it is 28 bits), the relationship may also be "slot 0<slot 1." instead. Accordingly, if "slot 0<slot 1," the terms slot 0 and slot 1 may be reversed in the description above. In essence, the embodiment deals with search space configuration rules for a first slot and a second slot, and it does not by any means impose any limitations as to which slots the first slot and the second slot are.

(Embodiment 3)

In Embodiment 3, a plurality of types of DCI bit counts allocatable to the R-PDCCH region per slot are defined. The base station and the terminal according to Embodiment 3 share the same basic configurations as those in Embodiment 1. Accordingly, a description will be provided referring back to FIGS. 9 and 10.

In base station 100 of Embodiment 3, configuration section 101 configures a resource region used for the transmission of DCI for terminal 200. Candidates of resource regions to be configured include a PDCCH region, an R-PDCCH region of slot 0, and an R-PDCCH region of slot 1.

Search space configuration section 103 configures a search space based on the search space configuration rule associated with a configuration resource region indicated by configuration information from configuration section 101. A search space configuration rule that is used when the resource region is an R-PDCCH region in slot 0 and a search space configuration rule that is used when the resource region is an R-PDCCH region in slot 1 have patterns regarding the number of unit region candidates targeted for decoding with respect to CCE aggregation level that mutually differ based on "any one value that falls between the minimum value and the maximum value that the coding rate may assume." In other words, the patterns regarding the number of unit region candidates targeted for decoding with respect to CCE aggregation level are independently specified for the R-PDCCH region in slot 0 and the R-PDCCH region in slot 1 on the basis of the "any one value that falls between the minimum value and the maximum value that the coding rate may assume." What is meant by "any one value that falls between the minimum value and the maximum value that the coding rate may assume" is, for example, a coding rate average. For purposes of brevity, a description will be provided below using a coding rate average.

For the case at hand, search space configuration rules employed for a slot with a low coding rate average and a slot with a high coding rate average will be referred to as the "first search space configuration rule" and the "second search space configuration rule," respectively. The term "coding rate average" refers to the average of a plurality of types of coding rates in cases where a plurality of types of DCI bit counts are defined. In addition, the expression "the defined DCI bit counts" refers to all types of DCI bit counts that may be allocated to the R-PDCCH region, and not to the DCI bit count that is actually allocated to each R-PDCCH region. Accordingly, if, for example, 42 bits and 56 bits are allocatable as DCI bit counts in slot 0, both 42 bits and 56 bits are used to calculate the coding rate average even if the DCI bit count that is actually allocated to the R-PDCCH region is 42 bits alone.

Variations of the "first search space configuration rule" and the "second search space configuration rule" are described below.

<Variation 7 of Search Space Configuration Rule>

Figure 20:
FIG. 20 is a diagram illustrating variation 7 of a search space configuration rule.

FIG. 20 is a diagram illustrating variation 7 of the search space configuration rule. As shown in FIG. 20, when slot 0 has a higher coding rate average than slot 1, the pattern of the first search space configuration rule is a pattern where, for CCE aggregation levels 1, 2, 4, and 8, the numbers of unit region candidates targeted for decoding are 8, 2, 2, and 0, respectively. On the other hand, the pattern of the second search space configuration rule is a pattern where, for CCE aggregation levels 1, 2, 4, and 8, the numbers of unit region candidates targeted for decoding are 1, 6, 3, and 2, respectively.

In other words, in variation 7 of the search space configuration rule, the patterns of the first search space configuration rule and the second search space configuration rule are determined in accordance with the coding rate average. The peak position of the distribution of unit region candidate groups targeted for decoding contained in the search space with respect to R-CCE aggregation level is located towards lesser R-CCE aggregation levels for the pattern of the first search space configuration rule than it is for the pattern of the second search space configuration rule.

The fact that "for the pattern of the first search space configuration rule, the peak position of the distribution of unit region candidate groups targeted for decoding with respect to R-CCE aggregation level is shifted towards lesser CCE aggregation levels than it is for the pattern of the second search space configuration rule" signifies the matters below.

<Matter 1> It signifies that the weighted average of the inverses of the coding rate averages (i.e., redundancies) with respect to the number of blind decoding operations is greater for the second search space configuration rule than it is for the first search space configuration rule. The weighted average of the inverses of the coding rate averages (i.e., redundancies) with respect to the number of blind decoding operations (i.e., the number of unit region candidates targeted for decoding) is represented by Equation (5) below:

[Eq. 5]

$$X'_{Slot\#n} = \frac{\sum\limits_{R\text{-}CCE\ aggregation\ level} \left( (avg.\ (\text{coding rate per }R\text{-}CCE\ agg.\ \text{level}))^{-1} \times (\#\ \text{of blind decoding opeartions}) \right)}{\sum\limits_{R\text{-}CCE\ aggregation\ level} \#\ \text{of blind decoding operations}} \quad (5)$$

Equation (5) may be modified as in Equation (6) below.

[Eq. 6]

$$X'_{Slot\#n} = \frac{\sum\limits_{R\text{-}CCE\ aggregation\ level} \left( (avg.\ (\text{coding rate per }R\text{-}CCE\ agg.\ \text{level}))^{-1} \times (\#\ \text{of blind decoding opeartions}) \right)}{\sum\limits_{R\text{-}CCE\ aggregation\ level} \text{number of blind decoding operations}} \quad (6)$$

$$= \left( avg.\ \frac{(DCI\ \text{bit count})}{(\#\ \text{of }REs\ \text{per }R\text{-}CCE) \times (\text{mod. level})} \right)^{-1}.$$

(weighted $avg.$ of $R\text{-}CCE\ agg.$ levels
with respect to# of blind decoding opeations)

Accordingly, the weighted average of the inverses of the coding rate averages (redundancies) with respect to the number of blind decoding operations may also be described as the product obtained by multiplying the inverse of the coding rate average per R-CCE with the weighted average of R-CCE aggregation levels with respect to the number of blind decoding operations.

<Matter 2> It signifies that the R-CCE aggregation level at which the number of unit region candidates targeted for decoding becomes greatest for the first search space configuration rule is lower than it is for the second search space configuration rule. If there are a plurality of R-CCE aggregation levels at which the number of unit region candidates targeted for decoding is greatest, it signifies that the average value of the R-CCE aggregation levels at which the number of unit region candidates targeted for decoding is greatest is lower for the first search space configuration rule than it is for the second search space configuration rule, <Matter 3> It signifies that the weighted average of R-CCE aggregation levels with respect to the number of blind decoding operations is lower for the first search space configuration rule than it is for the second search space configuration rule.

<Matter 4> It signifies that the weighted average of R-CCE aggregation level indices with respect to the number of blind decoding operations is lower for the first search space configuration rule than it is for the second search space configuration rule. R-CCE aggregation level indices are numbered 0, 1, 2, 3 in ascending order of R-CCE aggregation level. With respect to R-CCE aggregation levels 1, 2, 4, and 8, their R-CCE aggregation level indices are defined as 0, 1, 2, and 3, respectively.

Assuming that the number of REs per R-CCE is 44 in slot 0 and 72 in slot 1, that the number of DCI bits is 42 bits and 56 bits in slot 0 and 42 bits in slot 1, and that the modulation level is QPSK, whether or not the above-mentioned <Matter 1> to <Matter 4> are satisfied may specifically be confirmed as follows.

<Matter 1>

The weighted average of the inverses of the coding rate averages with respect to the number of blind decoding operations is $((((42+56)/2/(44\times2))^\wedge(-1))\times1+(((42+56)/2/(88\times2))^\wedge(-1))\times6+((((42+56)/2/(176\times2))^\wedge(-1))\times3+(((42+56)/2/(352\times2))^\wedge(-1))\times2)/(1+6+3+2) \approx 6.14$ in slot 0, and is $((((42/(72\times2))^\wedge(-1))\times8+(((42/(144\times2))^\wedge(-1))\times2+((42/(288\times2))^\wedge(-1))\times2+((42/(576\times2))^\wedge(-1))\times0)/(8+2+2+0) \approx 5.71$ in slot 1. Thus, the relationship "first search space configuration rule<second search space configuration rule" is satisfied.

<Matter 2>

The R-CCE aggregation level at which the number of blind decoding operations becomes greatest is 2 for the second search space configuration rule, and 1 for the first search space configuration rule. Thus, the relationship "first search space configuration rule<second search space configuration rule" is satisfied, <Matter 3>

The weighted average of R-CCE aggregation levels with respect to the number of blind decoding operations is $(1\times1+2\times6+4\times3+8\times2)/(1+6+3+2)\approx3.42$ for the first search space configuration rule, and $(1\times8+2\times2+4\times2+8\times0)/(8+2+2+0)\approx1.67$ for the first search space configuration rule. Thus, the relationship "first search space configuration rule<second search space configuration rule" is satisfied.

<Matter 4>

The weighted average of R-CCE aggregation level indices with respect to the number of blind decoding operations is $(0\times1+1\times6+2\times4+3\times2)/(1+6+3+2)\approx1.50$ for the second search space configuration rule, and $(0\times8+1\times2+2\times2+3\times0)/(8+2+2+0)\approx0.50$ for the first search space configuration rule. Thus, the relationship "first search space configuration rule<second search space configuration rule" is satisfied.

Allocating section 108 allocates the DCI to unit region candidates targeted for decoding indicated by the search space information from search space configuration section 103. The DCI is thus transmitted to terminal 200.

In terminal 200, if the region indicated by the search space region information received from configuration information receiving section 206 is an R-PDCCH region in slot 0 or an R-PDCCH region in slot 1. PDCCH receiving section 207 performs blind decoding on the basis of the search space configuration rule corresponding to each region. These rules correspond to the above-described roles adopted in base station 100.

According to the present embodiment, search space configuration section 103 of base station 100, as described above, configures a search space based on the search space configuration rule corresponding to the R-PDCCH region of the slot to be configured.

If the average coding rate configured for slot 1 is greater than the average coding rate configured for slot 0, in the first search space configuration rule used for slot 0, the peak position of the distribution of unit region candidates targeted for decoding with respect to R-CCE aggregation level is located towards lesser R-CCE aggregation levels as compared to the pattern of the second search space configuration rule used for slot 1.

Thus, efficient DCI transmission using an adequate number of RE groups to satisfy the desired communication quality becomes possible. Consequently, it is also possible to prevent the blocking probability from increasing.

In the description above, it was assumed that the coding rates were so related as to satisfy "slot 0>slot 1." However, by way of example, if an R-PDCCH region of one RB's width is divided into two in slot 1, or if the number of DCI bits in slot 0 is less than that in slot 1 (e.g., if DCI format 1C is assigned to slot 0 so that it is 28 bits), the relationship may also be "slot 0<slot 1" instead. Accordingly, if "slot 0<slot 1," the terms slot 0 and slot 1 may be reversed in the description above. In essence, the embodiment deals with search space configuration rules for a first slot and a second slot, and it does not by any means impose any limitations as to which slots the first slot and the second slot are.

The description above involved coding rate "averages." However, it may instead range from a lower limit value to an upper limit value for a plurality of coding rates that are averaged. Specifically, it is assumed that the number of REs per R-CCE is 44 in slot 0, and 72 in slot 1. It is assumed that the number of DCI bits is 42 bits and 56 bits in slot 0, and 42 bits in slot 1. It is assumed that the modulation level is QPSK (2) for both. In this case, the lower limit value for the coding rate of slot 0 is $42/(44\times2)\approx0.48$. The upper limit value for the coding rate of slot 0 is $56/(44\times2)\approx0.634$. The lower limit value and upper limit value for the coding rate of slot 1 are equal to each other at $42/(72\times2)\approx0.29$.

(Other Embodiments)

(1) In variations 1-7 of the search space configuration rule described in the embodiments above, examples were given where, for both the first search space configuration rule and the second search space configuration rule, the peak position of the distribution of unit region candidate groups targeted for decoding contained in the search space with respect to R-CCE aggregation: level is located off-center towards either lesser or greater R-CCE aggregation levels. However, the claimed invention is by no means limited as such, and instead, the peak position of one of the first search space configuration rale and the second search space configuration rule may he located on the lesser side while the peak, position of the other is located on. the greater side. By thus using such search space configuration rules where peak positions differ significantly between the first slot and the second slot. the base station is able to flexibly allocate DCI even under a fluctuating propagation environment.

(2) In the foregoing embodiments, descriptions were provided with respect to the R-PDCCH regions of slot 0 and slot 1 within the same subframe. However, the claimed invention is by no means limited as such, and is also applicable to a plurality of R-PDCCH regions that are offset by at least one slot time-wise. In addition, it is also applicable to a plurality of R-PDCCH regions that are offset by at least one RB frequency-wise. It is also applicable to a plurality of R-PDCCH regions that are offset by at least one slot and at least one RB time-wise and frequency-wise, respectively.

(3) In the foregoing embodiments, descriptions were provided assuming QPSK for the modulation scheme of the R-PDCCH. However, the claimed invention is by no means limited as such, and is also applicable to cases where the modulation scheme for the R-PDCCH is some scheme other than QPSK.

(4) In the foregoing embodiments, descriptions were provided with respect to antennas. However, the claimed invention is similarly applicable to antenna ports.

The term "antenna port" refers to a logical antenna including one or more physical antennas. In other words, the term "antenna port" does not necessarily refer to a single physical antenna, and may sometimes refer to an array antenna including a plurality of antennas, and/or the like.

For example, 3GPP LTE does not specify the number of physical antennas in an antenna port, but specifies an antenna port as a minimum unit in which a base station can transmit different reference signals.

An antenna port may also be specified as a minimum unit by which weightings of precoding vectors are multiplied.

(5) In the foregoing embodiments, the claimed invention is configured with hardware by way of example, but the claimed invention may also be provided by software in cooperation with hardware.

The functional blocks used in the descriptions of the foregoing embodiments may typically be implemented, as an LSI, which is an integrated circuit. They may be individual chips, or some of or all of them may be integrated into a single chip. The term "LSI" is used here, but the terms "IC," "system LSI," "super LSI," or "ultra LSI" may also be adopted depending on the degree of integration.

Alternatively, circuit, integration may also be implemented using a dedicated circuit or a general-purpose processor other than an LSI. An FPGA (field programmable gate array) which is programmable after LSI manufacturing, or a reconfigurable processor which allows reconfiguration of connections and settings of circuit cells in an LSI may be used.

Should a circuit integration technology replacing LSI appear as a result of advancements in semiconductor technology or other derivative technology, the functional blocks could be integrated using such a technology. Biotechnology applications, and/or the like, are conceivable prospects.

The disclosure of the specification, the drawings, and the abstract included in Japanese Patent Application No. 2010-164309, filed on Jul. 21, 2010, is incorporated herein by reference in its entirety.

INDUSTRIAL APPLICABILITY

The base station, terminal, transmission method, and reception method of the claimed invention are useful in that they are capable of efficiently transmitting downlink allocation control information.

REFERENCE SIGNS LIST 100 base station
101 configuration section
102 control section
103 search space configuration section
104 PDCCH generating section
105, 106, 107 coding/modulating section
108 allocating section
109 multiplexing section
110, 213 IFFT section
111, 214 CP adding section
112, 215 RF transmitting section
113, 201 antenna
114, 202 RF receiving section
115, 203 CP removing section
116, 204 FFT section
117 extracting section
118 IDFT section
119 data receiving section
120 ACK/NACK receiving section
131 transmission region configuration section
132 transmission mode configuration section
200 terminal
205 demultiplexing section
206 configuration information receiving section
207 PDCCH receiving section
208 PDSCH receiving section
209, 210 modulating section
211 DFT section
212 mapping section

The invention claimed is:

1. A transmission apparatus comprising:
    circuitry, which, in operation:
        maps downlink control information to at least one of a first search space or a second search space,
        wherein the first search space includes a plurality of first decoding region candidates, each corresponding to any one of first control channel element (CCE) aggregation levels, and the second search space includes a plurality of second decoding region candidates, each corresponding to any one of second CCE aggregation levels,
        wherein a weighted average of CCE aggregation levels with respect to a number of decoding region candidates included in the first search space is greater than that of the second search space, and the weighted average is calculated by dividing a sum of the products of CCE aggregation levels and corresponding number of decoding region candidates by a sum of the number of decoding region candidates for each search space, and
        wherein a number of resource elements (REs) configured for possible extended-PDCCH transmission in the first search space is smaller than that in the second search space; and
    a transmitter, which, in operation, transmits the mapped downlink control signal.

2. The transmission apparatus according to claim 1, wherein the first search space and the second search space are configured in an extended downlink control channel on a data region.

3. The transmission apparatus according to claim 1, wherein a number of resource elements (REs) that compose one CCE in the first search space is smaller than that of the second search space.

4. The transmission apparatus according to claim 1, wherein the first search space and the second search space are terminal specific search spaces (UE-specific search spaces).

5. The transmission apparatus according to claim 1, wherein the transmitter further transmits higher layer signaling information which indicates a subframe on which the first search space or the second search space is configured.

6. The transmission apparatus according to claim 1, wherein multiple sets of relationship between the CCE aggregation level and the number of the decoding region candidates are defined for each of the first search space and the second search space.

7. A transmission method comprising:
    mapping downlink control information to at least one of a first search space or a second search space,
        wherein the first search space includes a plurality of first decoding region candidates, each corresponding to any one of first control channel element (CCE) aggregation levels, and the second search space includes a plurality of second decoding region candidates, each corresponding to any one of second CCE aggregation levels,
        wherein a weighted average of CCE aggregation levels with respect to a number of decoding region candidates included in the first search space is greater than that of the second search space, and the weighted average is calculated by dividing a sum of the products of CCE aggregation levels and corresponding number of decoding region candidates by a sum of the number of decoding region candidates for each search space, and
        wherein a number of resource elements (REs) configured for possible extended-PDCCH transmission in the first search space is smaller than that in the second search space; and
    transmitting the mapped downlink control signal.

8. The transmission method according to claim 7, wherein the first search space and the second search space are configured in an extended downlink control channel on a data region.

9. The transmission method according to claim 7, wherein a number of resource elements (REs) that compose one CCE in the first search space is smaller than that of the second search space.

10. The transmission method according to claim 7, wherein the first search space and the second search space are terminal specific search spaces (UE-specific search spaces).

11. The transmission method according to claim 7, wherein the transmitting further includes transmitting higher layer signaling information which indicates a subframe on which the first search space or the second search space is configured.

12. The transmission method according to claim 7, wherein multiple sets of relationship between the CCE aggregation level and the number of the decoding region candidates are defined for each of the first search space and the second search space.

* * * * *